United States Patent [19]

Sturza

[11] Patent Number: 5,548,294
[45] Date of Patent: Aug. 20, 1996

[54] DIELECTRIC LENS FOCUSED SCANNING BEAM ANTENNA FOR SATELLITE COMMUNICATION SYSTEM

[75] Inventor: Mark A. Sturza, Woodland Hills, Calif.

[73] Assignee: Teledesic Corporation, Kirkland, Wash.

[21] Appl. No.: 292,148

[22] Filed: Aug. 17, 1994

[51] Int. Cl.⁶ ........................................... H04B 7/185
[52] U.S. Cl. ........................... 342/372; 342/354; 455/13.1
[58] Field of Search .................................... 342/354, 352, 342/372; 455/12.1, 13.1

[56] References Cited

U.S. PATENT DOCUMENTS

| | | | |
|---|---|---|---|
| 4,868,886 | 9/1989 | Annal et al. ........................... | 455/12 |
| 4,931,802 | 6/1990 | Annal et al. ........................... | 342/356 |
| 5,073,900 | 12/1991 | Mallinckrodt ........................... | 375/1 |
| 5,115,248 | 5/1992 | Roederer ........................... | 342/373 |
| 5,408,237 | 4/1995 | Patterson et al. ........................... | 342/354 |

OTHER PUBLICATIONS

T. Morita et al., "Microwave Lens Matching . . . ", published in IRE Transactions On Antennas & Proagation, Jan. 1956, pp. 33–39.

J. J. Lee, "Dielectric Lens Shaping . . . ", published by IEEE Transactions On Antennas & Propagation, Jan. 1983, pp. 211–215.

G. D. M. Peeler et al., "Microwave Stepped–Index Luneberg Lenses", published in IRE Transactions On Antennas & Propagation, manuscript rec'd 8 Feb. 1957, pp. 202–207.

Chester L. Parsons et al., "Design of a Large-Apeture Lens", published in IEEE Transactions On Antennas & Propagation, Aug. 1988, pp. 1162–1165.

D. M. Harrsion et al., "A Hemispherical Lens Antenna . . . ", published in IEEE, 1992, pp. 1332–1335.

T. C. Cheston et al., "Constant-K Lenses", published in Emerson & Cuming, Inc., reprinted from APL Technical Digest, Mar.–Apr. 1963.

"Hemispherical Constant–K Lens with Schmidt Correction, Using Concetric Spherical Focal Serfaces", published in RF Antenna Systems.

G. C. Cloutier et al., "Scanning Characteristics of Microwave Aplanatic Lenses", published in IRE Transactions On Antennas & Propagation, Oct. 1957, pp. 391–396.

David K. Cheng, "Modified Luneberg Lens for Defocused Source", published in IRE Transactions On Antennas & Propagation, Jan. 1960, pp. 110–111.

J. J. Lee et al., "A Coma–Corrected Multibeam Shaped Lens Antenna . . . ", published in IEEE Transactions on Antennas & Propagation, Jan. 1983, pp. 216–219.

J. J. Lee, "Numerical Methods Make Lens Antennas Practical", published in Microwaves, Sep. 1982, pp. 81–84.

E. M. T. Jones et al., "Measured Performance of Matched Dielectric Lenses". published in IRE Transactions On Antennas & Porpagation, Jan. 1956, p. 31.

(List continued on next page.)

Primary Examiner—Thomas H. Tarcza
Assistant Examiner—Dao L. Phan
Attorney, Agent, or Firm—Anglin & Giaccherini

[57] ABSTRACT

A method and apparatus for providing a plurality of beams (30) transmitted and received from positions in low Earth orbit (11) for communicating directly with a plurality of portable, mobile and fixed terminals and gateways is disclosed. A plurality of scanning beam antennas (28) is deployed on each satellite (12) within a constellation (10) of satellites placed in low Earth orbit (11). Each one of said plurality of scanning beam antennas (28) simultaneously receives and transmits a plurality of beams (30), each of which beams (30) illuminates cell (26) in an Earth-fixed grid (20). The beams (30) are formed by each scanning beam antenna (28) and are focused on the cell (26) by a dielectric lens (60). A preferred embodiment uses a Luneberg spherical lens (60). Each beam (30) is electronically shaped and steered to keep the cell (26) of the Earth-fixed grid (20) within the beam footprint (50).

1 Claim, 23 Drawing Sheets

OTHER PUBLICATIONS

W. R. Free et al., "Performance of a High–Power Constant Index Lens Antenna", recieved from Engineering Experiment Station, Georgia Institute of Technology, Atlanta, pp. 1–26.

M. A. Mitchell et al., "A Multiple–Beam Multiple–Frequency SphericalLens...", received by Georgia Institute of Technology–Naval Ocean Systems Center, pp. 394–398.

"On the Generalized Luneberg Lenses", published in IEEE Transactions On Antennas & Propagation, Sep. 1969, p. 644.

*High Technology Products*, published by Cuming Corporation.

Ann Lee Peebles, "A Dielectric Bifocal Lens...", published by IEEE Transactions On Antennas & Propagation, May 1988, pp. 599–606.

H. F. Mathis, "Checking Design of Stepped Luneberg Lens", published in IRE Transactions On Antennas & Propagation, May 1960, pp. 342–343.

Texas Instruments TGF4212, Medium–Power Microwave GaAs FET, Advance Information catalog, published by Texas Instruments Inc.

X–Band GaAs MMIC, High Power Amplifier Chip catalog, published by Hughes Microelectronics Division.

Pacific Monolithics data sheet on PM2012 1900 MHz GaAs MMIC Power Amplifer.

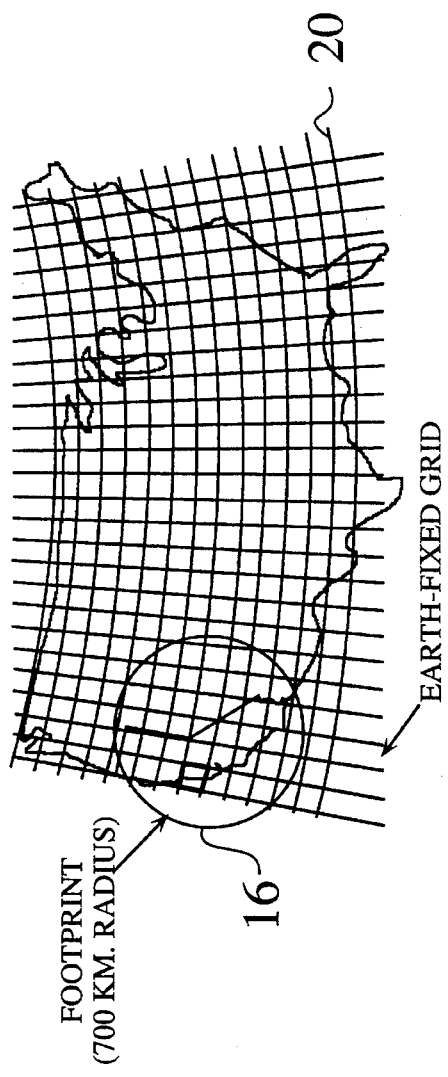
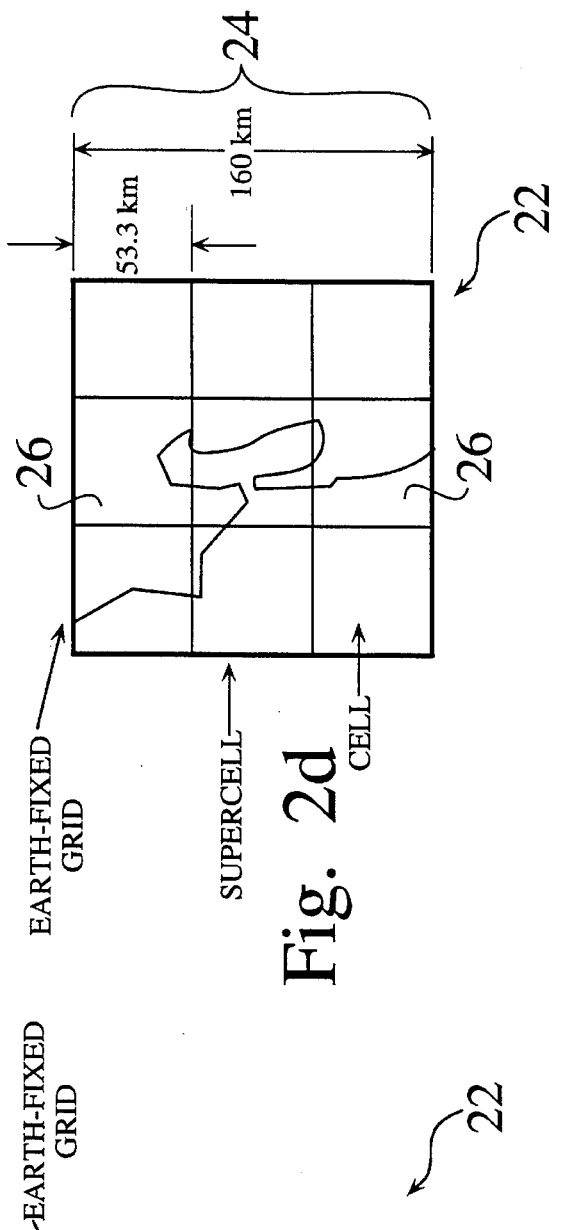

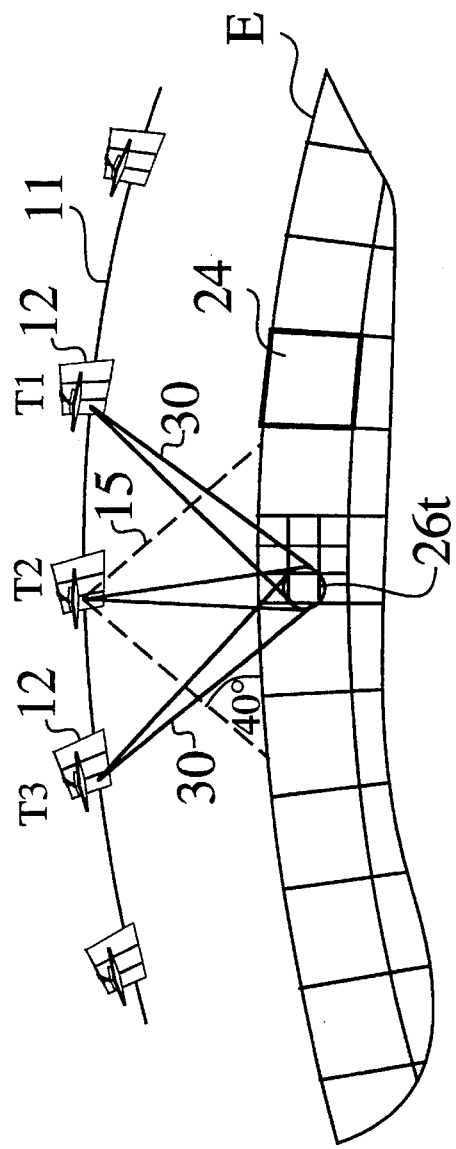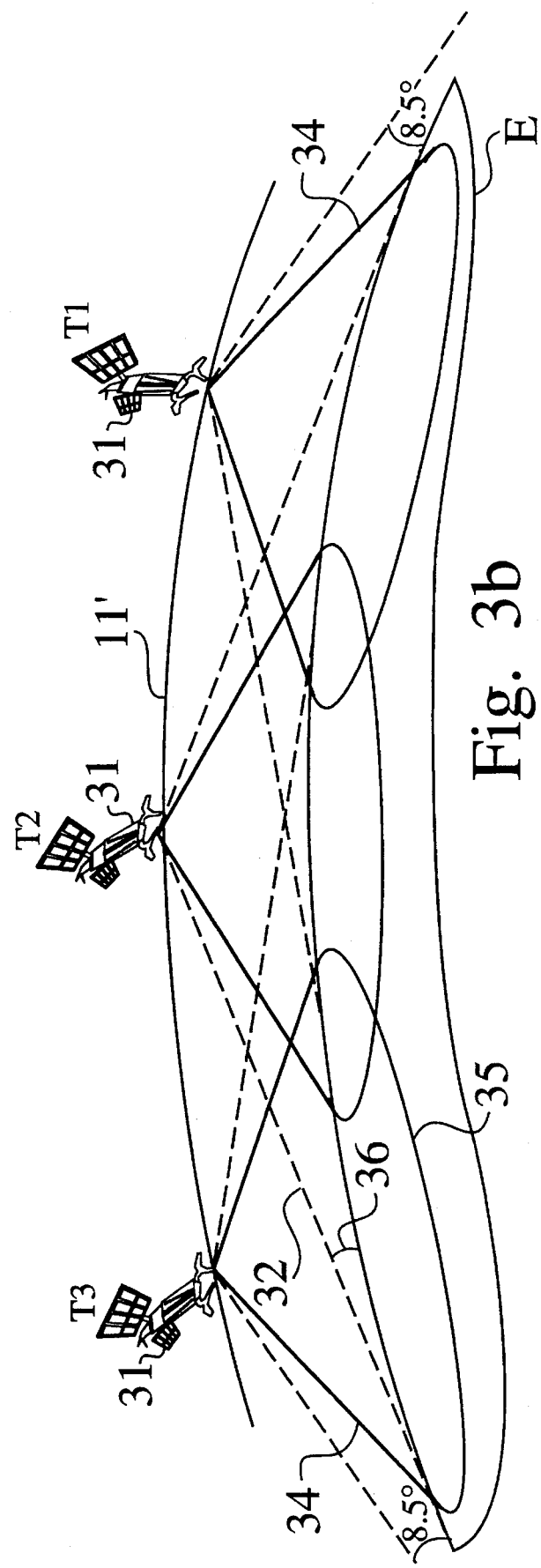

Frequency = 28.8 GHz ± 0.2 GHz
Altitude = 700 km
Cell Size = 53.3 km on each side
Super Cell Size = 160 km on each side
Diameter = 9.9 inches
Max. Nadir Offset = 43.5°

Frequency = 19.0 GHz ± 0.2 GHz
Altitude = 700 km
Cell Size = 53.3 km on each side
Super Cell Size = 160 km on each side
Diameter = 15 inches
Max. Nadir Offset = 43.5°

Frequency = 19 GHz
Diameter = 15 inches
Horn Width = 0.84 inch
Edge Taper = 0.3

DIELECTRIC LENS FOCUSED SCANNING BEAM ANTENNA FOR SATELLITE COMMUNICATION SYSTEM

CROSS-REFERENCES TO RELATED PATENT APPLICATIONS

The present patent application is related to the following commonly-owned and commonly-assigned pending patent applications:

Satellite Communication System by Edward Fenton Tuck et al., filed on 28 Feb. 1994 and assigned U.S. Ser. No. 08/203,140, and claiming the benefit of priority of a parent application entitled Satellite Communication System by Edward F. Tuck et al., filed on 28 Oct. 1991, and assigned U.S. Ser. No. 07/783,754;

Terrestrial Antennas For Satellite Communication System by Asu Ram Jha, filled on 02 Dec. 1993 and assigned U.S. Ser. No. 07/984,609, and claiming the benefit of priority of a parent application entitled Terrestrial Antennas for Satellite Communication System by Asu Ram Jha, filed on Nov. 8, 1991, and assigned U.S. Ser. No. 07/790,273;

Non-Blocking Dynamic Fast Packet Switch for Satellite Communication System by David Palmer Patterson and Moshe Lerner Liron, filed on 12 May 1994 and assigned U.S. Ser. No. 08/241,984, and claiming the benefit of priority of a parent application entitled Switching Methods for Satellite Communication System by David Palmer Patterson and Moshe Lerner Liron, filed on 08 Nov. 1991 and assigned U.S. Pat. No. 07/790,805;

Earth-Fixed Cell Beam Management for Satellite Communication System by David Palmer Patterson and Mark Alan Sturza, filed on 08 Jul. 1993 and assigned U.S. Ser. No. 08/088,714, and claiming the benefit of priority of a parent application entitled Beam Compensation Method for Satellite Communication System by David Palmer Patterson and Mark Alan Sturza, filed on 08 Nov. 1991 and assigned U.S. Ser. No. 07/790,318;

Spacecraft Antennas & Beam Steering Methods for Satellite Communication System by Douglas Gene Lockie et al., filed on 11 May 1994 and presently assigned a U.S. Pat. No. 08/241,103 and claiming the benefit of priority of a parent application entitled Spacecraft Antennas & Beam Steering Methods for Satellite Communication System by Douglas Gene Lockie, filed on 28 Oct. 1992 and assigned U.S. Ser. No. 07/967,988 and claiming the benefit of priority of a parent application entitled Spacecraft Antennas & Beam Steering Methods for Satellite Communication System by Douglas Gene Lockie, filed on 08 Nov. 1991 and assigned U.S. Ser. No. 07/790,271;

Inflatable Torus & Collapsible Hinged Disc Spacecraft Designs for Satellite Communication System by James R. Smart et al., filed on 05 May 1994 and presently assigned a U.S. Ser. No. 08/238,568 and claiming the benefit of priority of a parent application entitled Spacecraft Designs for Satelite Communication System by James R. Smart, filed on 18 Aug. 1992 and assigned U.S. Ser. No. 07/931,625, which claims the benefit of priority of a parent application entitled Spacecraft Designs for Satellite Communication System by James R. Smart, filed on 08 Nov. 1991 and assigned U.S. Ser. No. 07/790,748;

Spacecraft Intersatellite Link for Satellite Communication System by Douglas G. Lockie et al., filed on Jul. 16, 1992 and assigned U.S. Pat. No. 07/915,172;

Traffic Routing for Satellite Communication System by Moshe Lerner Liron, filed on Feb. 9, 1993 and assigned U.S. Ser. No. 08/016,204; and Modular Communication Satellite by James R. Smart, filed on Jun. 11, 1993 and assigned U.S. Ser. No. 08/075,425.

CLAIM FOR PRIORITY

The inventor hereby claims the benefit of priority under Section 120 of Title 35 of the United States Code of Laws for any and all subject matter which is commonly disclosed in the present application and in pending patent application U.S. Ser. No. 08/088,714 entitled Earth-Fixed Cell Beam Management for Satellite Communication System by David P. Patterson et al., filed on 08 Jul. 1994. The inventor hereby also claims the benefit of priority under Section 120 of Title 35 of the United States Code of Laws for any and all subject matter which is commonly disclosed in the present application and in a pending patent application entitled Satellite Communication System by Edward F. Tuck et al., filed on 28 Feb. 1994 and assigned U.S. Ser. No. 08/203,140.

FIELD OF THE INVENTION

The present invention relates to the field of satellite antennas. More particularly, this invention provides a wideband, electronically-steered, multi-beam satellite antenna system that includes a spherical dielectric lens, such as a Luneberg lens or constant k lens, for focusing the antenna beams on an Earth-fixed grid.

BACKGROUND OF THE INVENTION

Conventional public phone systems rely primarily on land lines and microwave repeaters to handle vast amounts of call traffic. Improvements of cellular networks have enhanced phone service by providing access to the land based system to customers using mobile phones in their vehicles or hand-held portable units. The increased capacity offered to the subscriber is relatively small compared to the number of subscribers using conventional fixed phones, since cellular service is limited to only those geographical regions that are densely populated. Cellular communication is often afflicted by poor performance when customers travel from one cell to another, or when they traverse the radio shadows projected by terrain or buildings.

One previous attempt to bypass the limits of conventional communications networks utilizes a transportable telephone that employs a satellite dish several feet in diameter to communicate directly with satellites in 22,300 mile geostationary orbits. The transponders on board these satellites then connect the caller directly to the land-based system, which directs their call through switches on the ground. These devices are heavy, difficult to transport, and are prohibitively expensive.

Other attempts to provide telephone services using a satellite constellation have been constrained by the difficulty of providing adequate bandwidths and complex beam steering capabilities. Building a network which includes intersatellite links that offers wide instantaneous bandwidth and precise electronic beam steering antennas is difficult using conventional technology. Line losses and dispersion effects at millimeter wave frequencies impose severe obstacles when conventional hardware is employed. Furthermore, conventional systems are heavy, need excessive DC power and are very expensive.

Public phone companies do not currently offer continuous world-wide voice, video and data service to subscribers using personal or mobile terminals without the use of costly and large antenna systems. Commercial spacecraft and transponders that are presently on orbit do not generally possess the power capacity to communicate directly with terminals that are not coupled to an antenna dish that is at least a few feet in diameter. The service which is available is extremely limited and too expensive for use by all but a few. Replacement of world-wide long distance telephone lines with a radio communications network will result in very high revenues. The problem of providing an economically viable network for voice, data, and video which can be used at any time by subscribers all over the world has presented a major challenge to the communications business.

Several publications, noted below disclose various antenna systems that pertain to communications systems designed to operate in conjunction with satellites flying in geosynchronous and lower Earth orbits.

U.S. Pat. No. 4,931,802 by Assal et al. discloses a satellite designed exclusively for operation in geosynchronous orbit. Assal et al. describe a multibeam communication satellite which uses a large number of small pencil beams which the authors aver reduces satellite antenna ground terminal power requirements and increases frequency reuse. The referenced patent specification describes a satellite-switched time division multiple access (TDMA) scheme. Assal et al. intended their invention for use only with satellites in geosynchronous orbit where the positions are relatively fixed with respect to points on the Earth. Assal et al. did not anticipate low Earth orbit satellites and therefore did not address the problems faced by low orbit satellites, such as compensating for the rapid motion of a satellite with respect to the Earth.

U.S. Pat. No. 4,004,098 issued to Shimasaki et al. discloses a space division multiple access (SDMA) communications satellite system which utilizes a pair of satellite relays having a communications link between them. Each satellite includes a plurality of receive and transmit "spotbeam" antennas. Each spotbeam antenna communicates with a different geographical zone which includes one or more earth stations. Each station may communicate with other stations in the system including those within the field of view of the other satellite. No means for electronic beam steering is claimed or discussed, nor is any such means shown in the block diagram, FIG. 2, of this reference. There is disclosed a spot beam antenna "pointed" or "oriented to transmit signals" to "respective Earth stations S1, S2, S3 and S4." How the antennas are pointed or oriented is not discussed, but the language strongly suggests mechanical positioning of the antennas as a whole, not steering of the transmitted beams.

In U.S. Pat. No. 5,107,925, Bertiger et al. disclose a multiple beam, space antenna for facilitating communications between a satellite and a plurality of Earth based stations. Bertiger et al. show radiating surfaces deployed on a satellite in low Earth orbit, the radiating surfaces being coupled and arranged in a pattern which approximates the contour of an oblate hemisphere. Each of the radiating surfaces are capable of emitting and receiving a plurality of radiated beams and inherently include a plurality of matched pairs of surfaces for separately transmitting and receiving the beams. The antenna of Bertiger et al. contains a number of horn antennas mounted in concentric circular groups on an inflatable supporting structure. A lens may be used to focus the beams emanating from the horn antennas. Bertiger et al. do not show the radiating surfaces being capable of simultaneously generating a plurality of beams that are electronically steered to positions on the Earth's source. Focusing of the beams in Bertiger et al. is used to suppress sidelobes and limit diffusion of the beam, not to direct the beam to certain areas of the Earth's surface or provide gain. The planar lenses discussed in this reference require mechanical tuning and can be easily seen to be "passive" in that the beams are fixed in their direction from the satellite.

In U.S. Pat. No. 4,335,388, Scott et al. disclose a multibeam antenna which produces a null at one or more specified points with greater frequency band width for a given null depth. An antenna assembly is disclosed which has a phase rotation means coupled to the antenna elements to adjust the phase of a signal applied to each of the antenna elements. Phase rotation nulling is used such that a narrow beam at a null point can be turned off, thereby reducing interference from discrete sources of radiation in that segment of the beam pattern without materially changing the composite pattern in other directions. Producing a low ripple shaped beam at one or more specified points with much greater frequency bandwidth than the prior art for a given null depth is not an objective or result of the present invention. Further, the adjustment of phasing which produces a null in the beams of Scott et al., are not equatable to the beam steering and shaping of the present invention which compensates for the grazing angle at the Earth's surface as well as providing directivity and power gain. Because of the frequency division multiple access (FDMA) technique used in the present invention, adjacent beams in this novel system are transmitted and received at different design frequencies.

Bertiger, Leopold and Peterson describe a Satellite Cellular Telephone and Communication System in European Patent Application No. 891 184 58.2. This application sets out some details of the proposed Iridium™ system currently designed to use sixty-six satellites in low Earth orbit which generate relatively large footprints of radio beams due to their extremely low mask angle of eight and one-half degrees (8.5°). This system would employ "satellite-fixed cells" which are not defined by constant boundaries on the Earth. The cells would sweep over vast regions of the Earth at very high speeds. This method of satellite-fixed cells introduces extremely complicated "hand-off" problems as one satellite moves out of range of a subscriber and another satellite must support the call without interruption.

In an article entitled A Multibeam Active Antenna for an European Contiguous Coverage at Ku-Band, published in the Proceedings of the IEEE, 1989, Bartolucci et al. discuss active multibeam antennas for European coverage at Ku-band frequencies.

Acampora et al. explain their Metropolitan Area Radio System Using Scanning Pencil Beams in the 1991 edition of the Proceedings of the IEEE. The authors of this paper propose a metropolitan area radio system that would provide continuous 360° coverage over a large service region from a centrally located base station. The authors claim that this approach differs from others because the base station would blanket the service region with a raster of very narrow pencil beams which could be rapidly scanned to any position in synchronism with the switching sequences of a time division multiple access assignment.

R. K. Luneberg described a spherical lens of material having a dielectric constant which varies uniformly from a value of 1.0 at the surface to a value of $\sqrt{2.0}$ at the center of the sphere in The Mathematical Theory of Optics, 1964, published in University of California Press, Berkeley, Calif. An ideal Luneberg lens will focus a plane wave precisely to a point on the lens surface and will expand a point source on the sphere's surface to a plane wave front emanating from the sphere.

A number of articles appearing in IRE Transactions on Antennas and Propagation describe the use of Luneberg lenses in multiple beam antenna systems. Notable among these is a paper by M. A. Mitchell et al. titled A Multiple-Beam Multiple-Frequency Spherical Lens Antenna System Providing Hemispherical Coverage, in the September, 1969 edition. A wide-band antenna system employing Luneberg lenses composed of spherically concentric, polystyrene shells is presented. According to the authors of the paper, the system produces multiple beams and provides hemispherical coverage with no scan losses.

G. D. M. Peeler and H. P. Coleman describe an investigation of stepped-index Luneberg lenses in their article entitled Microwave Stepped-Index Luneberg Lenses appearing in the April, 1957 edition of IRE Transactions on Antennas and Propagation. Expanded polystyrene materials with dielectric constants ranging from 1.1 to 2.0 in increments of 0.1 were used in connection with ten-step, eighteen-inch diameter spherical Luneberg lenses. Experimental data indicate that ten shells were sufficient for eighteen-inch diameters for use at X band.

In the APL Technical Digest, March–April, 1963, T. C. Cheston and E. J. Luoma compare the Luneberg lens and a spherical lens having an unvarying dielectric constant, the constant k lens. They conclude that the constant k lens has properties similar to the Luneberg lens but is more easily built, from a variety of materials, to have nominal beam forming characteristics.

The patent applications listed above in the section entitled Cross-References to Related Patent Applications disclose planar phased arrays that produce electronically steered beams. These arrays represent a substantial improvement over existing spot-beam antennas. In such systems, each phased array has about 1000 elements and requires relatively high power. The development of a low loss, multi-beam antenna system which would produce electronically steered beams addressing an Earth-fixed grid would constitute a major technological advance. Such a system would satisfy a long felt need within the electronics and telephone industries.

SUMMARY OF THE INVENTION

The methods and apparatus described and claimed below pertain to a multibeam antenna system which is deployed aboard each satellite in a constellation of low Earth-orbit satellites. The multibeam antenna system provides a plurality of beams transmitted and received from positions in Earth orbit, for communicating directly with a plurality of portable, mobile, and fixed terminals and gateways. A plurality of multibeam antennas is deployed on each satellite. Each one of the multibeam antennas simultaneously receives and transmits a plurality of beams. Each beam illuminates a segment of an Earth-fixed grid. The beams are formed by each multibeam antenna, and are focused on the segment of the Earth-fixed grid by a dielectric lens. Each beam is electronically shaped and steered to keep the segment of the Earth-fixed grid within the footprint of the beam.

Earth-Fixed Cell Beam Management

The radio beams which are generated by the multibeam antenna system are precisely controlled so they illuminate "Earth-fixed" cells which are segments of an Earth-fixed grid. Previous low-orbiting satellite communication schemes have used "satellite-fixed" cells. Satellites which fly in low Earth orbit move over large regions of the Earth's surface very rapidly. The radio beams generated by these fast-moving satellites sweep across the Earth's surface at the same rapid rate of speed. In a system that employs satellite-fixed cells, the "footprint" of the radio beams propagated by the spacecraft defines the area on the ground called a "cell". The satellite-fixed cell moves constantly with the satellite as it orbits the globe.

An Earth-fixed cell contrasts sharply with the satellite-fixed cell. It is a stationary region mapped to an Earth-fixed grid that has permanent boundaries on the Earth as does a city or a state. Although the satellite radio beams move over the ground rapidly, the location of the beam footprints at any time do not determine the location of the unchanging Earth-fixed cells. The great advantage of using Earth fixed cells is realized when a subscriber being served by one satellite must switch to another beam in the satellite or to another satellite because the first is moving out of range below the local horizon. A system with satellite-fixed cells requires the assignment of a new communication channel within the next beam or next satellite. The assignment process takes time and consumes processing capacity at the terminal station and the satellite. It is subject to blocking, call interruption and call dropping if there is not an unused communication channel in the new beam or satellite. The present invention takes advantage of the Earth-fixed cell method and continuously illuminates all of the cells that are within the beam footprints. The beams are continually adjusted to compensate the effects of satellite motion, attitude changes, rotation of the Earth and misalignment of the satellite track with the Earth-fixed grid. The reader is invited to read a more complete description of Earth-fixed cell beam management in U.S. application Ser. No. 08/088,714 listed above in the section entitled Cross-Reference to Related Patent Applications.

Each satellite electronically scans or steers its beams to the center of the Earth-fixed cell nearest to its nominal non-scanned position. If a satellite over the Equator "knows" that its neighboring satellites are fully functional, then all the beams within the nominal footprint will be activated and any beams outside that zone will not since they are not needed. In one preferred embodiment in which overlap of adjacent satellite footprints is taken into account, the satellite beams cover a square pattern on the surface of nineteen by nineteen for a total of 361 cells. Each of these 361 cells is addressed by one beam, shaped and focused to illuminate the cell. Additionally, eighty "pseudo cells" are placed along each side of the square so that the total pattern is twenty-one by twenty-one cells or 441 cells in all. The "pseudo cells" are an extra row of cells at the edge of the satellite footprint used to facilitate shaping and steering the beams at the edge of the footprint. Other embodiments may have more or fewer cells.

In one preferred embodiment, each satellite carries one receive multibeam antenna and nine transmit multibeam antennas.

A receive multibeam antenna comprises a group of feed elements, one for each cell and pseudo cell, mounted to the upper surface of a spherical, dielectric lens. The feed elements are placed in a contiguous pattern, spaced corresponding to the 361 cells in the satellite footprint and the eighty pseudo cells. The boresight of each feed element nominally points to the center of one of the Earth-fixed cells.

In one preferred embodiment, the spherical dielectric lens is a Luneberg lens comprising spherically concentric shells, each shell having a dielectric constant which increases from about 1.0 at the surface shell to 2.0 at the center of the sphere. These shells may be made from expanded polystyrene or high temperature plastic (HTP) material such as used for the heat shield tiles on NASA's Space Shuttle.

In other embodiments, the dielectric lens may be a constant-k spherical lens or a hemispherical constant-k lens with Schmidt correction at the radiating aperture.

Receiver "Front-End" Beam Steering

In a receiver front-end beam steering configuration, the feed elements are divided into groups corresponding to the number of cells in a super cell. In one preferred embodiment, there are nine cells in each super cell. Each of the nine cells operates on a different design frequency. Each of the receive lens feed elements is connected to a low noise amplifier (LNA). The LNA output is connected to a nine-way power divider. Each of the power divider outputs is connected to a digital attenuator and then input to a different, nine-way power combiner. The output of each power combiner is passed to a receiver mixer and intermediate frequency (IF) stages, and subsequently detected for signal processing. One of the power combiners corresponds to the nominal beam location associated with the feed element. The other combiners correspond to the nominal beam location associated with the eight adjacent feed elements. Each of the power combiners is, therefore, connected to nine feed elements that form a three by three grid on the lens surface. Adjusting the nine digital attenuators at the inputs to each of the 361 power combiners shapes one of the receive beams and steers it on the Earth's surface. Beam steering of about 0.6 cell width has been determined as sufficient to cover misalignment of the satellite footprint with the Earth-fixed grid. Steering of this amount along the satellite track increases the time before a user is illuminated by a new beam. Since the beams that illuminate the user's cell are always at the same frequency, the transfer from beam to beam is transparent to the user and occurs nearly instantly.

Transmitter Final Stage Beam Steering

In one preferred embodiment, nine transmit multibeam antennas having nine lenses are required to maintain reasonable power efficiency. Fewer transmit lenses are required if methods which combine two or more transmitter signals at one feed element, for example, diplexers, polarization combining, or space combining are used. A power loss of up to 10 dB can be suffered depending on the method of combining signals.

Each of the nine transmit lenses is mounted to 40–44 groups of nine feed elements arranged in groups of three by three grids. Each feed element is driven by a variable saturation power, high power amplifier (HPA). Each of the nine HPA's in a group is connected to one of the outputs of a nine-way power divider driven by the transmit signal for one of the 361 beams. Each HPA is preceded by a digital attenuator. As in the case of the receiving antenna, adjustment of each of nine attenuators associated with each of the 361 beam shapes and steers the transmit beam.

Beam Steering at the Receiver Base Band Frequency

An alternate method of beam steering is done at the receiver base band frequency. Receiver "front-end" processing for this alternative embodiment is conventional. For each one of a group of beams, the feed is connected by a waveguide to a receiver first mixer through a low noise amplifier and a filter/amplifier. The received frequency is converted to an intermediate frequency (IF) in the first mixer. The IF is amplified and input by coaxial cable to a filter/multiplexer which separates the output into nine frequencies used for the terminal-satellite link communications. The outputs from the filter/multiplexer are converted to the base band frequency by second-mixer stages. The output of each second-mixer stage is fed to a different analog-to-digital (A/D) converter which divides the signal into the nine components corresponding to the nine feed elements which form one beam. The digital outputs of a first A/D converter are connected to a nine-to-one combiner.

Each of the other eight outputs of the A/D converter are fed to a different combiner. One of the combiners corresponds to the nominal beam location associated with the feed at a first frequency F1. The other combiners correspond to the nominal locations associated with eight adjacent feeds at a first frequency F1. Thus each of the power combiners is connected to the nine feeds that form a three by three grid on the lens surface. The output of the combiner is the receive beam. Adjusting the amplitude of the signals at each A/D converter shapes and steers the beam on the Earth's surface.

Beam Steering at the Transmitter Base Band Frequency

The alternate method of beam steering at the transmitter base band frequency is essentially the same as for the receiver except the flow of signals is reversed. In the base band processing, processed signals for each beam of the forty groups of beams at a first frequency F1 are fed from the satellite's communications system to 361 nine-way power dividers. Each of the outputs of the nine-way dividers are connected to different A/D converters. The output from a first A/D converter at a first frequency associated with a first beam is converted to the IF band in a first mixer stage and fed by coaxial cable to a first filter/multiplexer. The outputs of eight mixers which are associated with the first beam are combined with the first output in the first filter/multiplexer. The combined signal output from the first filter/multiplexer is amplified and converted up to the final frequency band in a second mixer. This signal is amplified and filtered in an AGC controlled filter/amplifier and carried by wave guide to the feed through a bandpass filter. The beam emerging from the feed is shaped and steered by adjusting the amplitude of the signals output from each of the associated A/D converters.

Gateway to Satellite Link Scanning beam Antenna

Each satellite has a gateway-to-satellite link (GSL) antenna system consisting of one scanning beam antenna. The gateway stations are higher power, fixed terminals which are used to control the communications system and through which the local public telephone system can be accessed. A preferred embodiment employs one 30-inch diameter Luneberg lens with 3,249 feed elements used for both transmitting and receiving. The lens provides about 41 dB of gain at 20 GHz and 44 dB of gain at 30 GHz. There are 3,025 spot beams in the satellite footprint and 224 pseudo spot beams, requiring 3,249 feed elements. The pseudo spot beams are an extra row of spot beams around the satellite footprint used to facilitate the shaping and steering of the beams at the edge of the footprint.

Each of the feed elements is connected to a 30/20 GHz diplexer. In a manner similar to the low power terminal-to-satellite link, the 30 GHz receive port is connected to a 30 GHz low noise amplifier (LNA). In a preferred embodiment, each LNA output is connected to a digital attenuator and then input to a different nine-way power combiner. One of the power combiners corresponds to the nominal beam location associated with the feed element. The other power combiners correspond to the nominal beam locations associated with eight adjacent feed elements. Thus, each of the power combiners is connected to nine feed elements that form a three by three grid on the lens surface. Adjusting the nine digital attenuators at the inputs to each of the 3,025 power combiners shapes each one of the 3,025 receive beams and steers it on the Earth's surface.

Each 20 GHz diplexer transmit port is driven by a variable saturation power, high power amplifier (HPA). The HPA's are driven by the output of a nine-to-one switch. Each of the nine-to-one switch inputs is connected through a digital attenuator, to the output of a nine-way power divider. The nine-way power divider is driven by the transmit signal of one of the 3,025 beams.

The total number of simultaneous GSL transmit beams that can be generated is 361 and there must be at least two inactive beams between active ones. This separation is also required in order to support 100 percent frequency reuse between active beams.

An appreciation of other aims and objectives of the present invention and a more complete and comprehensive understanding of this invention may be achieved by studying the following description of preferred and alternative embodiments and by referring to the accompanying drawings.

BRIEF DESCRIPTION OF THE DRAWINGS

FIGS. 2a and 2b exhibit the relationship between a satellite footprint and an unchanging Earth-fixed grid.

FIGS. 2c and 2d illustrate the relationship between the Earth-fixed grid pictured in FIG. 2b and Earth-fixed supercells.

FIG. 3a is a schematic diagram that portrays a single satellite flying over a single Earth-fixed cell in three sequential positions. FIG. 3a also depicts the method of steering a beam of one frequency to continuously illuminate the cell during the times T1, T2 and T3.

FIG. 3b is an illustration of a satellite communication system that uses satellite-fixed cells and a low mask angle of 8.5 degrees.

FIG. 5 also shows the relatively fewer number of cells which must be covered because of overlap by other satellites, as indicated by the legend "Great circle boundary between adjacent satellites".

DETAILED DESCRIPTION OF PREFERRED AND ALTERNATIVE EMBODIMENTS

System Overview

The present invention is intended for use with a constellation 10 of satellites 12 operating in low Earth orbit 11. This system is designed to provide a high capacity network which provides its subscribers around the world with a wide range of telecommunications services at quality levels and prices that rival current terrestrial systems. The following discussion describes embodiments of the invention and the communication system within which it operates.

Figure 1:
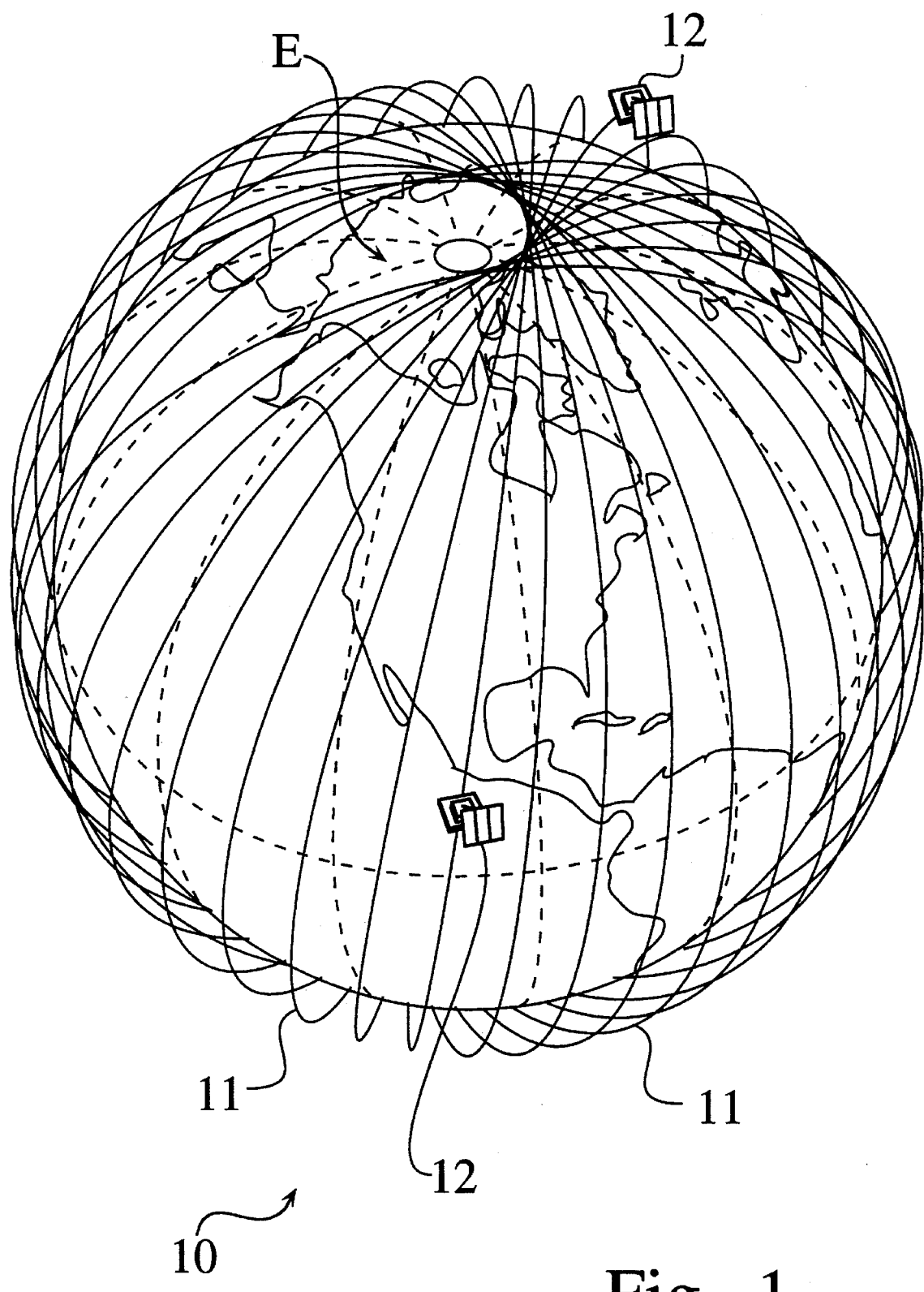
FIG. 1 is a schematic representation of the Earth and the preferred embodiment of the satellite constellation operating below geosynchronous altitude in twenty-one orbits. For the sake of simplicity, only two satellites are shown.

FIG. 1 depicts a schematic representation of the Earth E and the preferred embodiment of the constellation 10 operating at an altitude of 700 km, well below geosynchronous altitude, in twenty-one orbits 11.

FIG. 2a and 2b depict a satellite 12 orbiting the Earth E at an altitude of 700 Km and projecting a satellite "footprint" 16 of radio beams on an unchanging Earth-fixed grid. The present invention is deployed aboard each satellite 12 in the constellation of low Earth orbit satellites. The scanning beam antenna system provides a plurality of beams transmitted and received from positions in Earth orbit 11, for communicating directly with a plurality of portable, mobile, and fixed terminals. A plurality of scanning beam antennas is deployed on each satellite 12. A terminal-satellite link (TSL) scanning beam antenna system supports communications between the satellite 12 and portable, mobile and fixed terminals. A gateway-satellite link (GSL) scanning antenna supports communications between the satellite and gateway terminals connected to terrestrial telephone networks.

The communications system maps the Earth into the Earth-fixed grid 20 of approximately 20,000 frequency reuse groups called "supercells" 22 as shown in FIG. 2c and 2d. The supercells 22 approximate squares which are 160 km on a side 24. Each supercell 22 is further divided into nine cells 26 which measure 53.3 km on a side. One satellite beam is assigned to a cell 26. The system shapes and steers the beam so the cell 26 is illuminated by that beam until the next beam moves into position on that cell 26 or the next satellite 12 moves into position to illuminate the cell 26. Each Earth-fixed cell is assigned to only one satellite 12 at a time.

FIG. 3a is a schematic diagram that shows a single satellite 12 flying over a single Earth-fixed target cell 26t in three sequential positions, and steering a beam 30 of one frequency to continuously illuminate the cell 26 during the times T1, T2 and T3. As the satellite 12 progresses in its orbit 11, the radio beams 30 which are generated by the scanning beam antenna system are precisely steered so they illuminate the Earth-fixed cells 26.

FIG. 3b is an illustration of a satellite communication system that uses satellite-fixed cells 34 and a low mask angle of 8.5 degrees. Previous low-orbiting satellite communication schemes have used satellite-fixed cells 34. Satellites 31 which fly in low Earth orbit move over large regions of the Earth's surface E very rapidly. The radio beams 34 generated by these fast-moving satellites 31 sweep across the Earth's surface E at the same rapid rate of speed. In a system that employs satellite-fixed cells, the footprint of the radio beams 34 propagated by the spacecraft 31 defines the area on the ground called a cell 35. The satellite-fixed cell 35 moves constantly with the satellite 31 as it orbits the globe E.

An Earth-fixed cell 26 contrasts sharply with the satellite-fixed cell 35. It is a stationary region mapped to the Earth-fixed grid 20 that has permanent boundaries on the Earth E as does a city or a state. Although the satellite radio beams 30 move over the ground rapidly, the location of the beam footprints at any time do not determine the location of the unchanging Earth-fixed cells 26. The great advantage of using Earth-fixed cells is realized when a subscriber being served by one satellite 12 must switch to another beam 30 in the satellite 12 or to another satellite 12 because the first is moving out of range below the local horizon. A system with satellite-fixed cells 35 requires the assignment of a new communication channel within the next beam 34 or next satellite 31. The assignment process takes time, consumes processing capacity at the terminal station and the satellite. It is subject to blocking, call interruption and call dropping if there is not an unused communication channel in the new beam or satellite.

The present invention takes advantage of the Earth-fixed cell method and continuously illuminates all of the cells 26 that are within the beam footprints 16. The beams 30 are continually adjusted to compensate for the effects of satellite motion, attitude changes, rotation of the Earth E and non-alignment of the satellite track with the Earth-fixed grid 20. The reader is invited to read a more complete description of Earth-fixed cell beam management in U.S. application Ser. No. 08/088,714 referred to above.

Scanning Beam Antenna for Receiving

In one preferred embodiment, one TSL scanning beam receive antenna 28 operating in the 30 GHz band and nine identical TSL scanning beam transmit antennas 28 operating in the 20 GHz band produce 361 active receive and 361 active transmit beams 30. Each receive and each transmit beam 30 illuminates one cell 26 of the Earth-fixed grid 20. The beams are formed by each scanning beam antenna 28, and are focused on the cell 26 of the Earth-fixed grid by a dielectric lens. Each beam is electronically shaped and steered to keep the cell 26 within the footprint of each beam 30.

Although there are many possible variations including those in which fewer transmit antennas 28 are possible, this preferred embodiment and a few alternative embodiments are described in detail below to help the reader understand the principles of the present invention.

Figure 4:
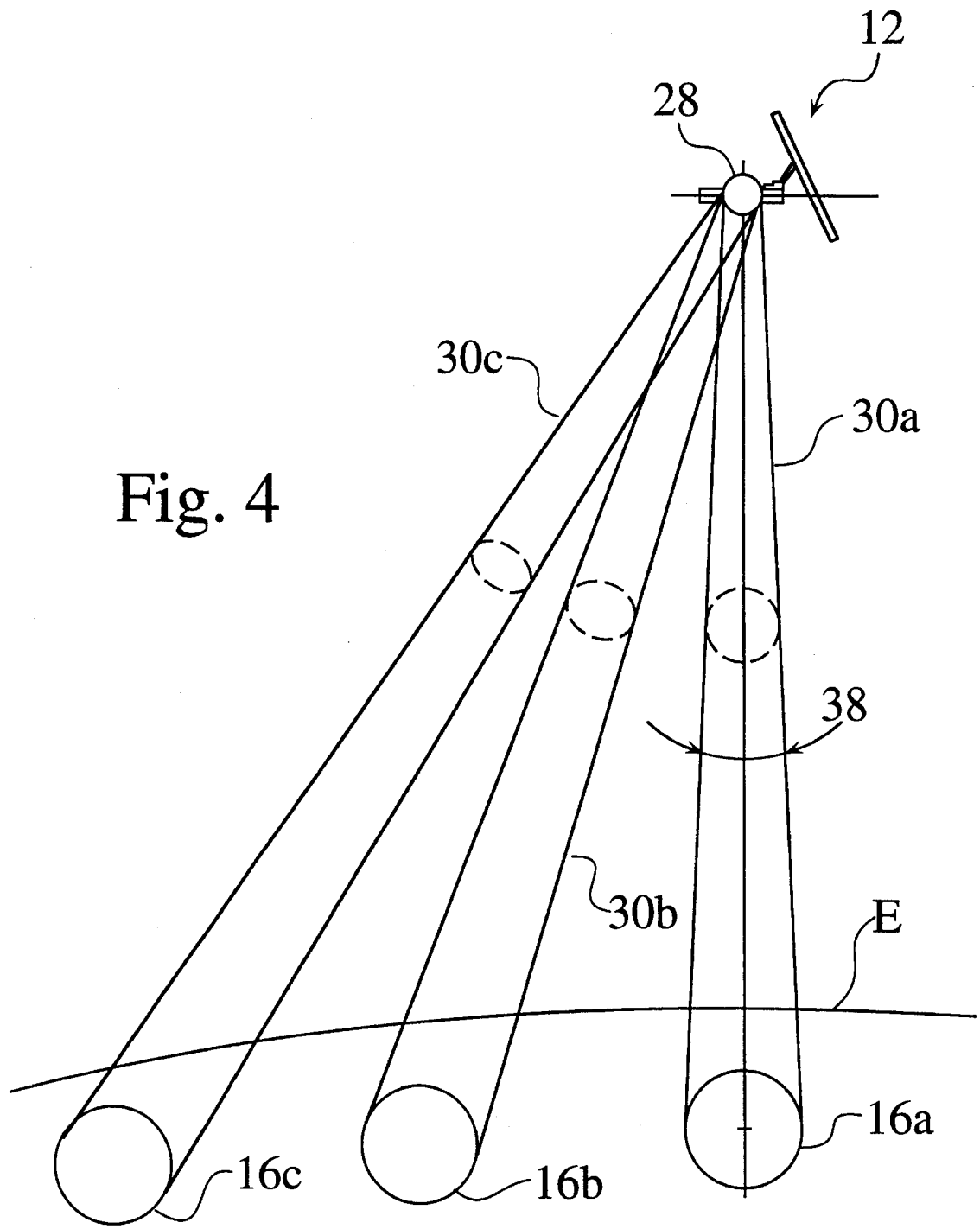
FIG. 4 is a schematic diagram of a satellite forming beams at three angles to the Earth's surface.
Figure 19:
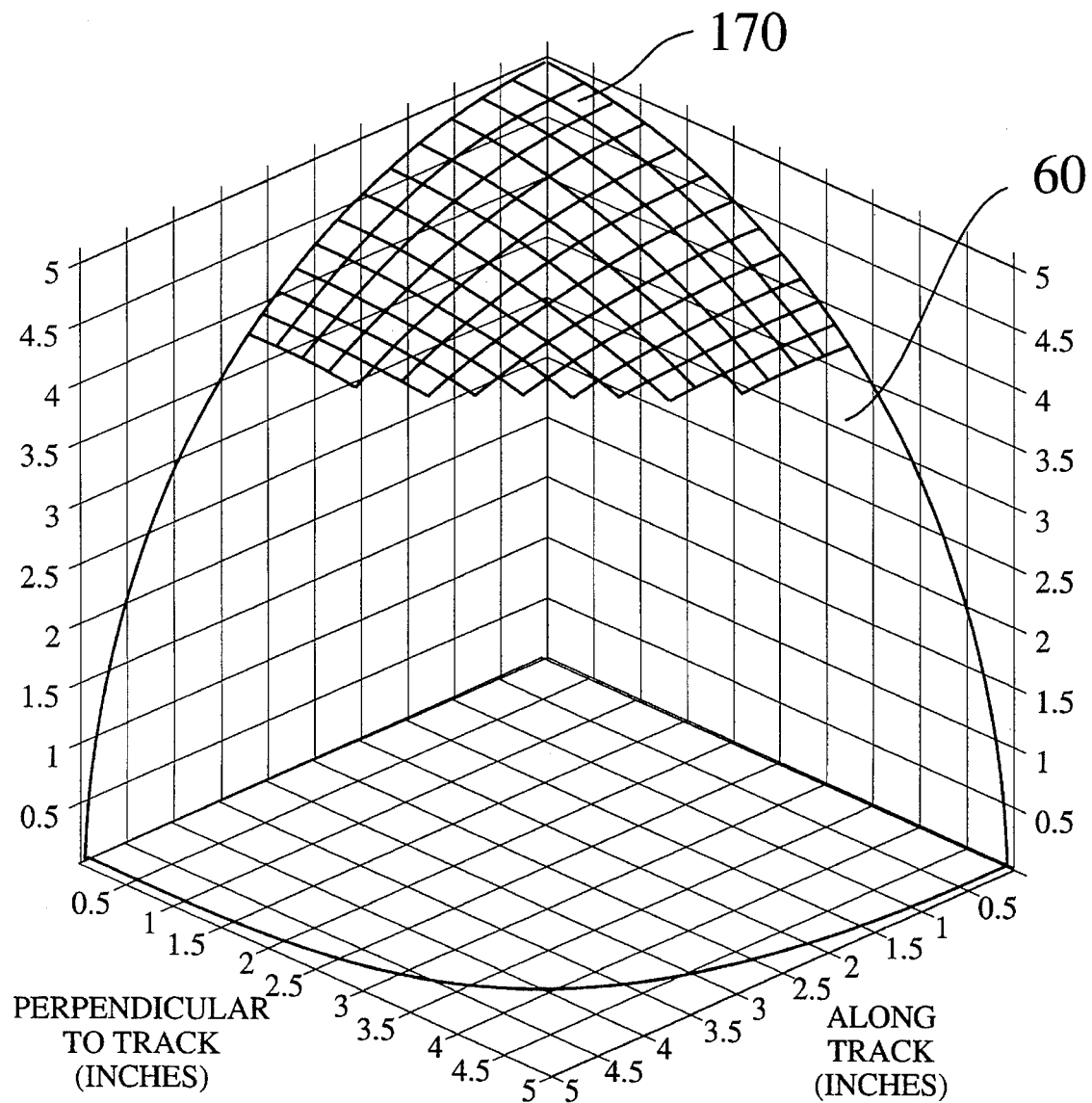
FIG. 19 is a three dimensional plot of one quadrant of the surface of a spherical lens of 9.9 inches diameter, depicting the projection of Earth-fixed cells on the surface, useful for showing the transition from inscribed squares of circular beams to inscribed rectangles of elliptical beams necessary to illuminate cells from Nadir to the extreme mask angle.
Figure 20:
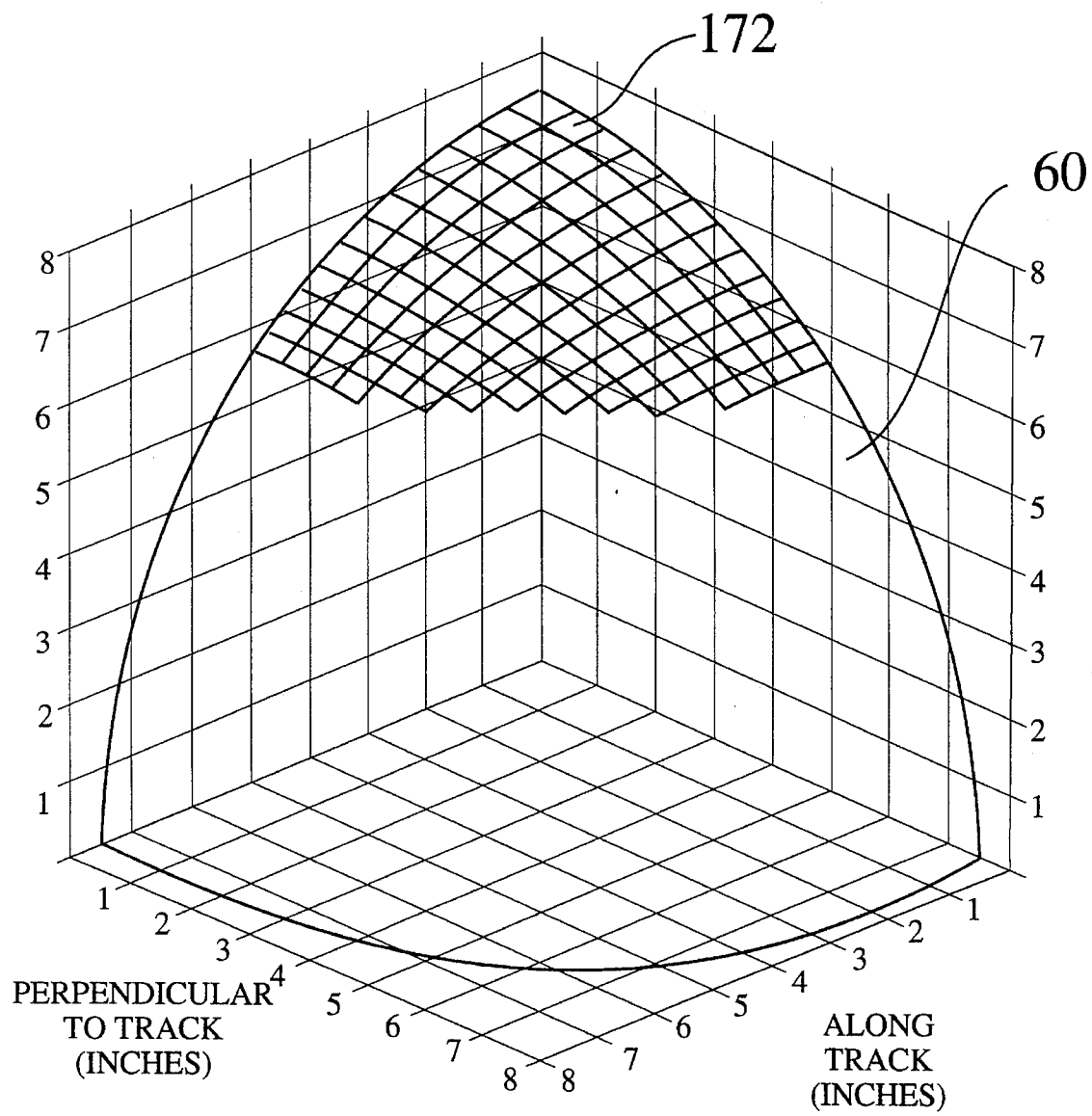
FIG. 20 depicts a three dimensional plot of one quadrant of the surface of a spherical lens of 15 inches diameter depicting the projection of Earth-fixed cells on the surface, useful for showing the transition from inscribed squares of circular beams to inscribed rectangles of elliptical beams necessary to illuminate cells from Nadir to the extreme mask angle.

As shown in FIG. 4, the beam 30a which is nearest the Nadir is circular in cross section and projects a circular footprint 16a on the ground. The beam 16a has a 3 dB beam width 38 of about 6.4 degrees. To provide circular footprints of each beam 30b,c on the Earth's surface as the direction from the satellite 12 to the target cell 26t moves toward the horizon, the beam 30b is shaped so that its cross section is elliptical. FIGS. 19 and 20 depict the cells as projected on a spherical lens surface, and portray the changing cell shapes. A beam 30c near the maximum mask angle of 40 degrees is shaped even more elliptically to maintain a circular footprint 16c on the ground. These beams 30a, 30b, 30c are shaped by amplitude weighting of the beam components. Other possible methods of beam shaping include deforming the antenna lenses. Although the preferred embodiment utilizes circular footprints 16, they may be formed in many alternative shapes, including hexagons.

Figure 5:
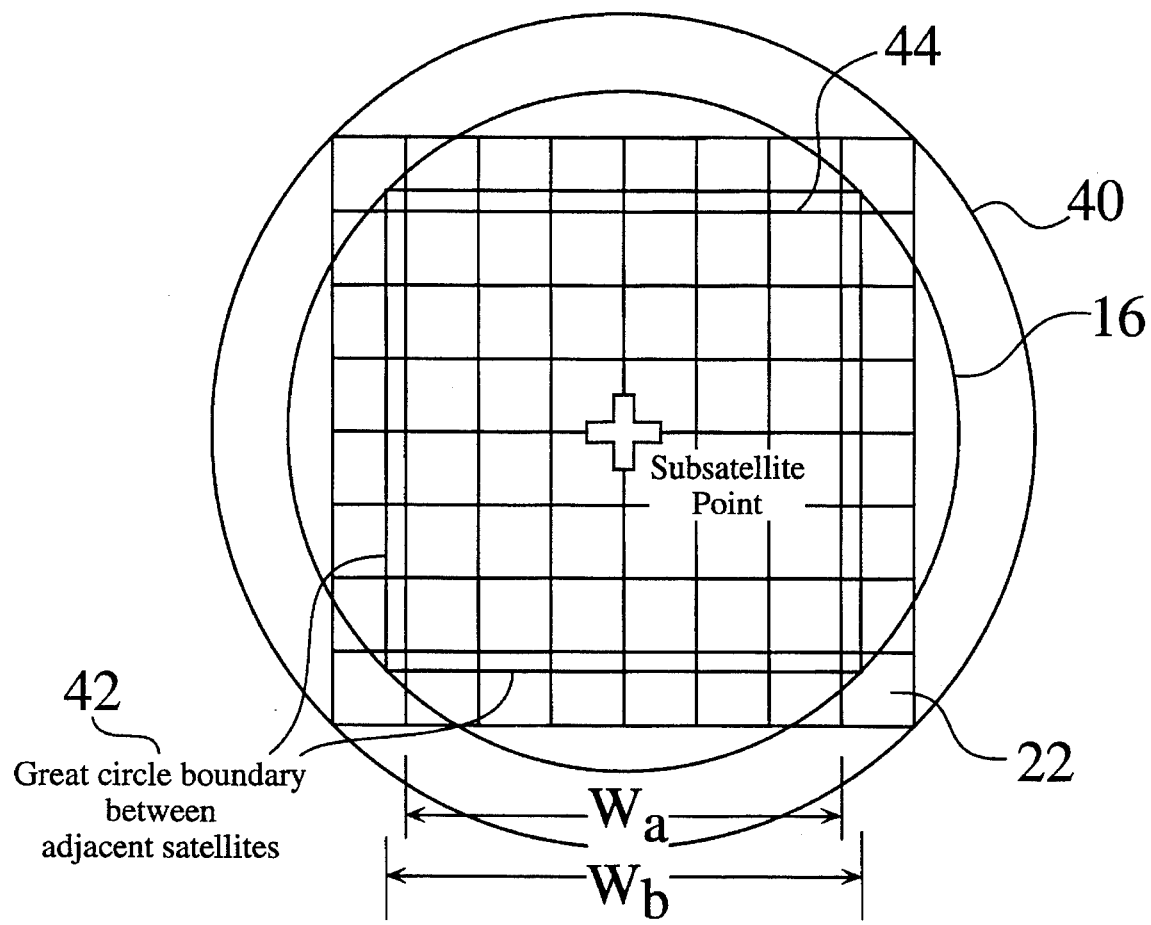
FIG. 5 is a schematic diagram that depicts the Earth-fixed supercells which are to be covered by beams at approximately 32 degrees and 40 degrees mask angle at an altitude of 700 km.

FIG. 5 is a schematic diagram which illustrates the Earth-fixed supercells 24 which are to be covered by beams 30 for mask angles of approximately thirty-two and/forty degrees at an altitude of 700 Km. Sixty-four supercells 24 lie wholly or partially within the footprint 16 at the 40 degree mask angle chosen for this embodiment. However, because of overlap by other satellites 12, a fewer number of supercells 24 must be covered. The region of overlap is bounded by lines indicated as the "Great circle boundary between adjacent satellites" 42. In the square whose width $W_b$ is defined by the great circle boundaries 42, there is a square 44 of thirty-six complete supercells 24 whose width is $W_a$ and a number of partial supercells. Three hundred sixty-one cells 26 lie within the supercells 24 and partial supercells between these great circle boundaries 42. These 361 cells occupy a square comprising nineteen by nineteen cells.

The system operates on nine frequencies in each of the transmit and receive bands. Each cell 26 in a group of three by three or nine cells 26 operates on one set of these nine frequencies. Since the same frequency will be reused three cells 26 away, each beam's sidelobes must be 30 dB down three cells away to prevent interference.

Figure 6:
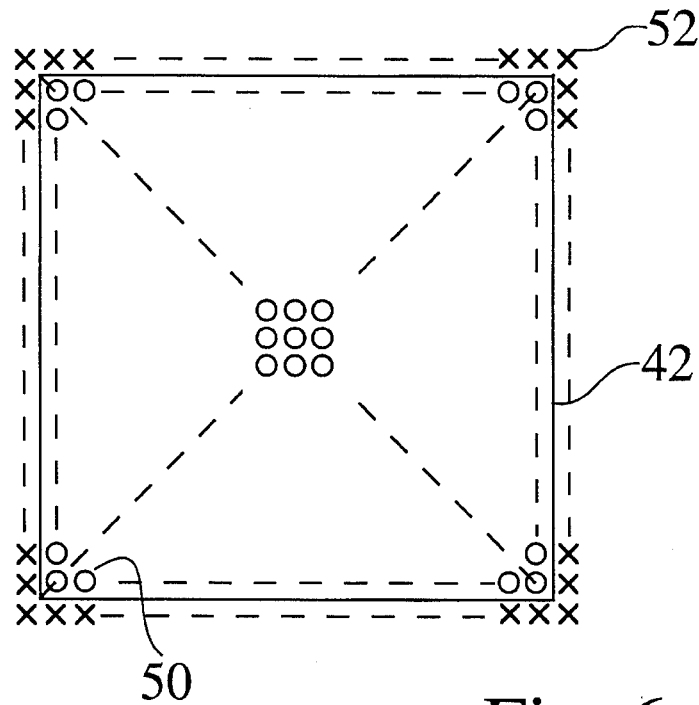
FIG. 6 is a schematic diagram showing nineteen by nineteen Earth-fixed cell footprints denoted "O" within the satellite footprint. Also shown are surrounding outside cells or "pseudo cells" denoted "X" which are used to steer the cells on the margin.

FIG. 6 is a schematic diagram showing the nineteen by nineteen Earth-fixed cell footprints 50. FIG. 6 also depicts surrounding outside cells or "pseudo cells" 52, which are used to facilitate steering the cells on the margins. The beams 30 are focused onto the footprints 16 on the Earth's surface E by using a dielectric lens placed in front of the feed horns of the scanning beam antenna 28. In this embodiment, the beams are focused using a spherical dielectric lens. This lens may be a "Luneberg" lens, a so-called "constant k" lens, or a hemispherical, constant-k lens with a Schmidt correction using concentric, spherical focal surfaces.

Figure 7:
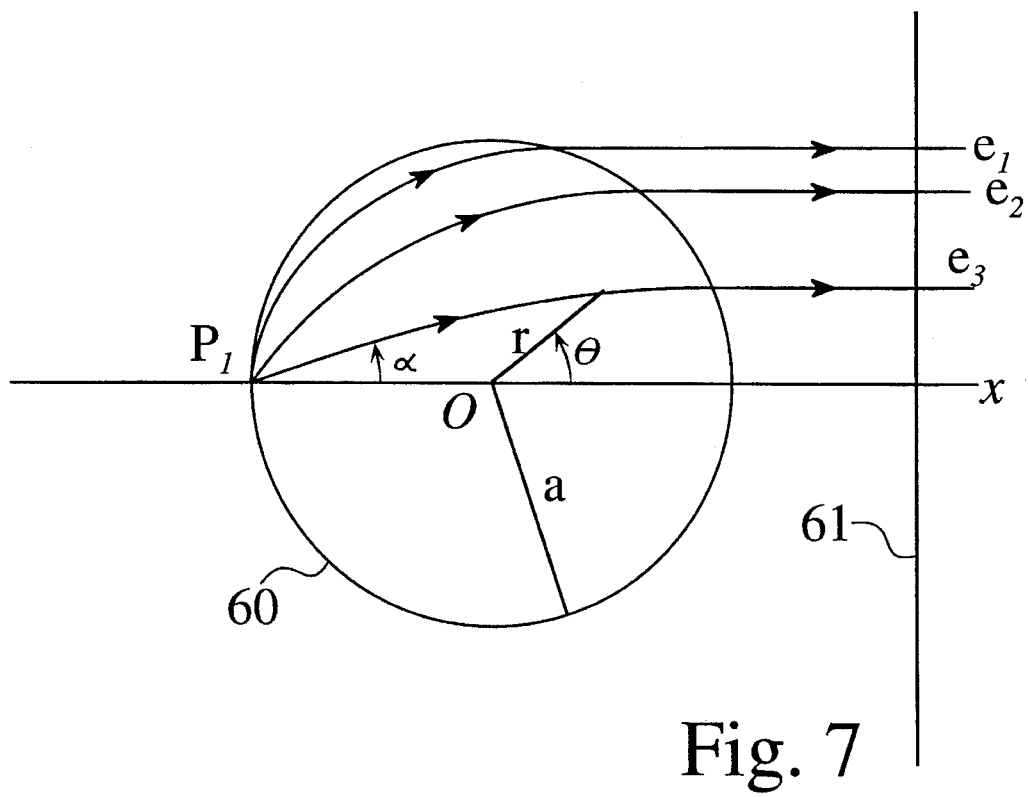
FIG. 7 is a schematic diagram of a "Luneberg" dielectric spherical lens. This figure reveals shows how rays emanating from a radio frequency point source are bent into a plane wave as they exit from the lens.

FIG. 7 is a schematic diagram of a Luneberg spherical dielectric lens 60. This figure reveals rays $e_{1,2,3}$ emanating from a radio frequency point source $P_1$ are bent into a plane wave 61 as they exit from the lens 60. The theoretical index of retraction of an optical Luneberg lens is given by the expression:

$$n(r)=(2-r^2)^{1/2} \qquad \text{Equation 1}$$

where n(r) is the index of refraction at a normalized radial dimension, $0 \leq r \leq 1$. The variation of n is uniform from 1.0 at the surface to $\sqrt{(2.0)}$ at the center. In the past, the lack of a suitable material has made spherical lens fabrication difficult. For microwave application, the Luneberg lens is made from concentric shells of dielectric material. The first shell has a nominal dielectric constant "k" of 1.0 and the center core of the lens has a dielectric constant of 2.0. The intermediate shells vary uniformly between k=1.0 and k=2.0. The Luneberg lens is an ideal wide-angle objective lens because of its complete symmetry. In their paper *Microwave Stepped-Index Luneberg Lenses*, published in IRE Transactions on Antennas and Propagation, April 1957, Peeler and Coleman described the use of expanded polystyrene materials with dielectric constants ranging from 1.1 to 2.0 in increments of 0.1 in connection with ten-step, eighteen-inch diameter spherical Luneberg lenses. While the discrete steps in k-value cause some distortion in the projected beam 30, experimental data reported in the Peeler paper indicate that ten shells were sufficient for eighteen-inch diameters for use at X band. In the preferred embodiment, a Luneberg lens diameter of about nine inches is utilized for a frequency of 30 GHz. A lens diameter of about thirteen inches is employed for the 20 GHz frequency. Other dielectric materials are suitable for these lenses, for example, the high temperature plastic (HTP) material from which the NASA Space Shuttle heat shielding tiles are fabricated. The lenses are capable of providing 32 dB of gain, and beam sidelobes that are 30 dB down at off-axis angles exceeding 1.45 times the beam width.

Figure 8:
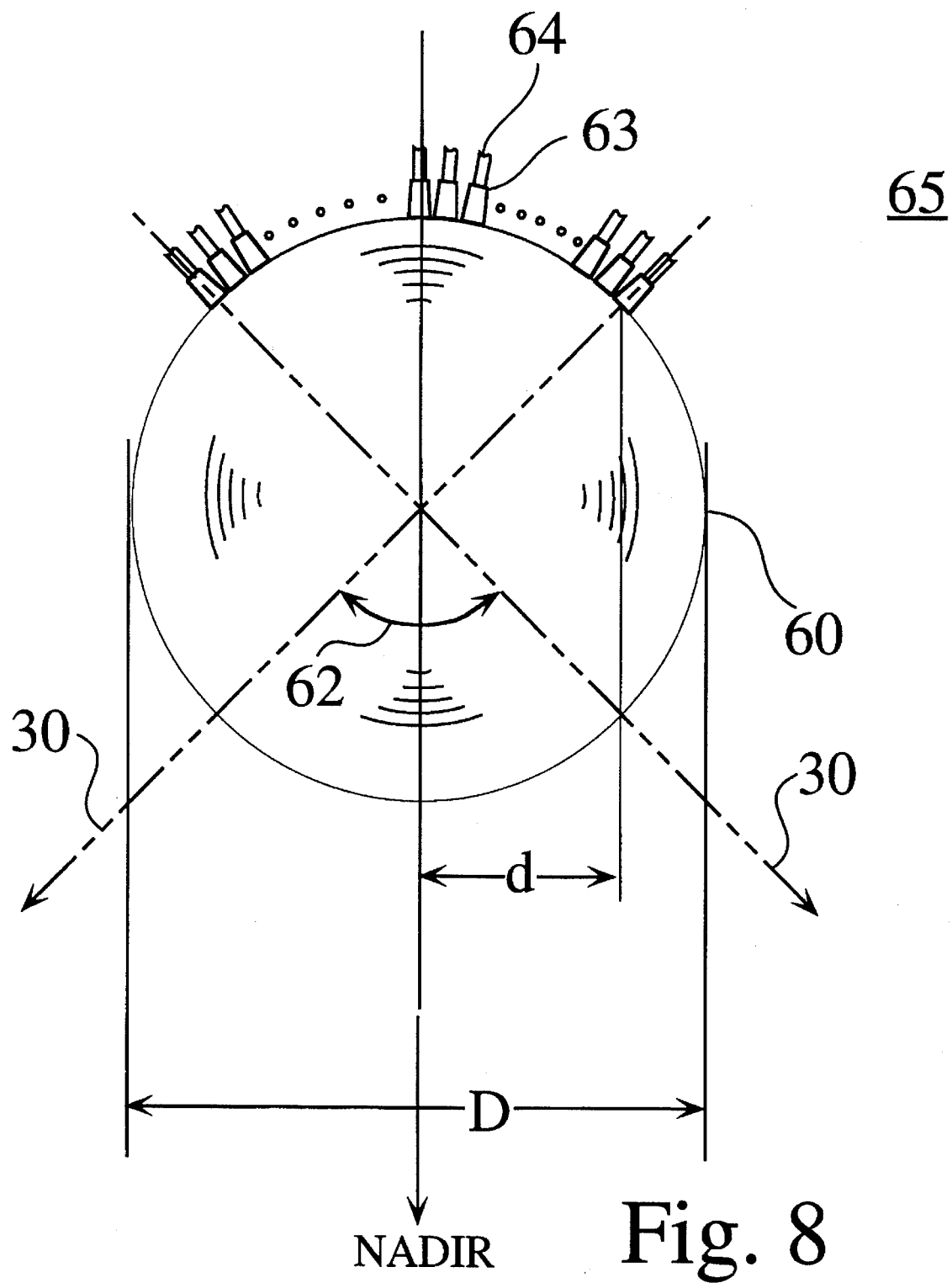
FIG. 8 is a schematic diagram of a number of feed elements mounted to the surface of a Luneberg lens, depicting the physical properties of such a lens-feed element combination in one preferred embodiment.

FIG. 8 is a schematic diagram of a feeds-lens combination 65. A number of feeds are mounted to the surface of a Luneberg lens 60. For the receive scanning beam antenna 28, having feeds 63 spaced one cell 26 apart, 441 feeds are required. This represents nineteen by nineteen or 361 cells 26, plus eighty pseudo cells. The feeds 63 are connected to the rest of the system by waveguides 64. To ensure that feeds do not interfere with an emerging ray e of the beam 30, the dimension d from the vertical axis of the lens 60 to the extreme feed 63 may not be more than about 43.3 percent of the lens diameter D. For a mask angle of 40 degrees, the included angle 62 between beam centerlines at the extreme feeds is 87 degrees. Twice the dimension d is then about 70 percent of the lens diameter D, well within the limit.

To track a target cell 26t, the beams 30 must be steerable by one-half of the beamwidth plus 0.3 degrees. This is because of the variations in satellite attitude, non-alignment of the satellite track with the Earth-fixed grid 20 and beam pointing error. This represents a movement of the beam footprint 50 of about 0.6 of the width of a cell 26. Steering of the beams 30 is accomplished by amplitude weighting of the beam components.

There are variations of beam 30 transmission loss over the satellite footprint 16. The slant range from the satellite to Earth at the Nadir is 700 km. The maximum slant range at 40 degrees mask angle is 1,022 km. Free space loss varies inversely as the slant range squared. Thus, the free space loss over the footprint 16 is 20 *Log (1022/700)=3.3 dB. To this loss must be added 2 to 3 dB due to beam 30 gain variation over the Earth-fixed cell 26 being serviced. This 5.3 to 6.3 dB variation must be accounted for in the link power budget. One solution is to fix different gains at different parts of the footprint, for example, one for a ring of beams 30 at the center of the footprint 16 and one for an outer ring of beams 30. This would reduce the variation across the footprint by 1.65 dB. Three antenna beam gains reduces the variation by 2.2 dB, and so on. Another solution is to specify the individual beam gains as a function of angle from the Nadir. The latter solution offers a more efficient use of satellite power.

Figure 9:
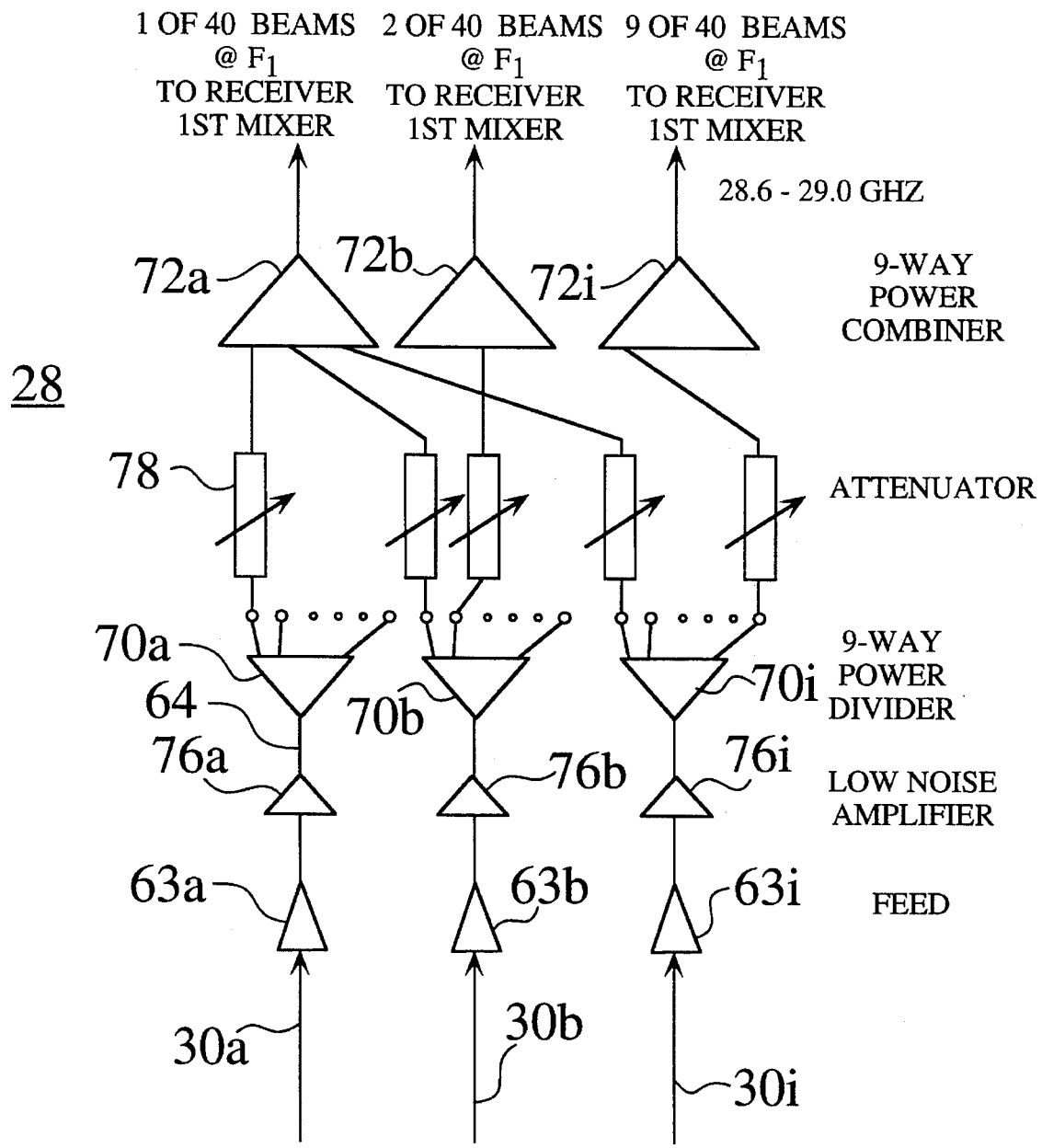
FIG. 9 is a block diagram of a scanning beam receive antenna illustrating the variable power dividers, digital attenuators and variable power combiners used at the receiver front end in one preferred embodiment to steer the received beams.

FIG. 9 is a schematic diagram of a scanning beam receive antenna 28 in one preferred embodiment in which beam steering occurs at the receiver front end. As noted above, the receive lens 60 has 441 feeds 63 spaced corresponding to the 361 cells 26 in the satellite footprint 16, plus eighty pseudo cells 52. A nine-element feed 63 is used to steer each beam 30. The nine elements are arranged in a three by three pattern. The center element corresponds to the nominal beam center. The other eight elements correspond to beam positions one 3 dB-beamwidth 38 displaced above, below, left, right and diagonally from the nominal beam position.

Each of the 441 feeds 63 are connected to a 30 GHz low noise amplifier (LNA) 76. FIG. 9 depicts one group of nine of forty beams at frequency $F_1$. The LNA output is connected to a nine-way variable power divider 70a–i. Each of the variable power divider 70a–i outputs is applied to an input 77 of a different nine-way power combiner 72a–i through a digital attenuator 78. One of the power combiners 72a corresponds to the nominal beam location of the feed 63a. The other power combiners 72b–i correspond to the nominal beam locations associated with the eight adjacent feeds 63b–i. Thus each of the power combiners 72a–i is connected to nine feeds 63a–i that form a grid of three by three feeds 63 on the lens 60 surface. Adjusting the nine digital attenuators 78 at the inputs to one of the 361 power combiners 72 shapes one of the 361 receive beams 30 and steers it on the Earth's surface E. The output of a power combiner 72 for a beam 30 at row n, column m, for $2 \leq n \leq 20$, $2 \leq m \leq 20$, is the (n,m) receive beam. This output may be calculated using the following expression:

$$Rec_{n,m} = \sum_{\substack{t=n-1,n,n+1 \\ f=m-1,m,m+1}} \alpha_{i,j}^{n,m} * FEED_{RiCj} \qquad \text{Equation 2}$$

where $\alpha_{i,j}^{n,m}$ is the attenuator setting for Feed, row i, column j, into receive beam n,m.

Figure 12A:
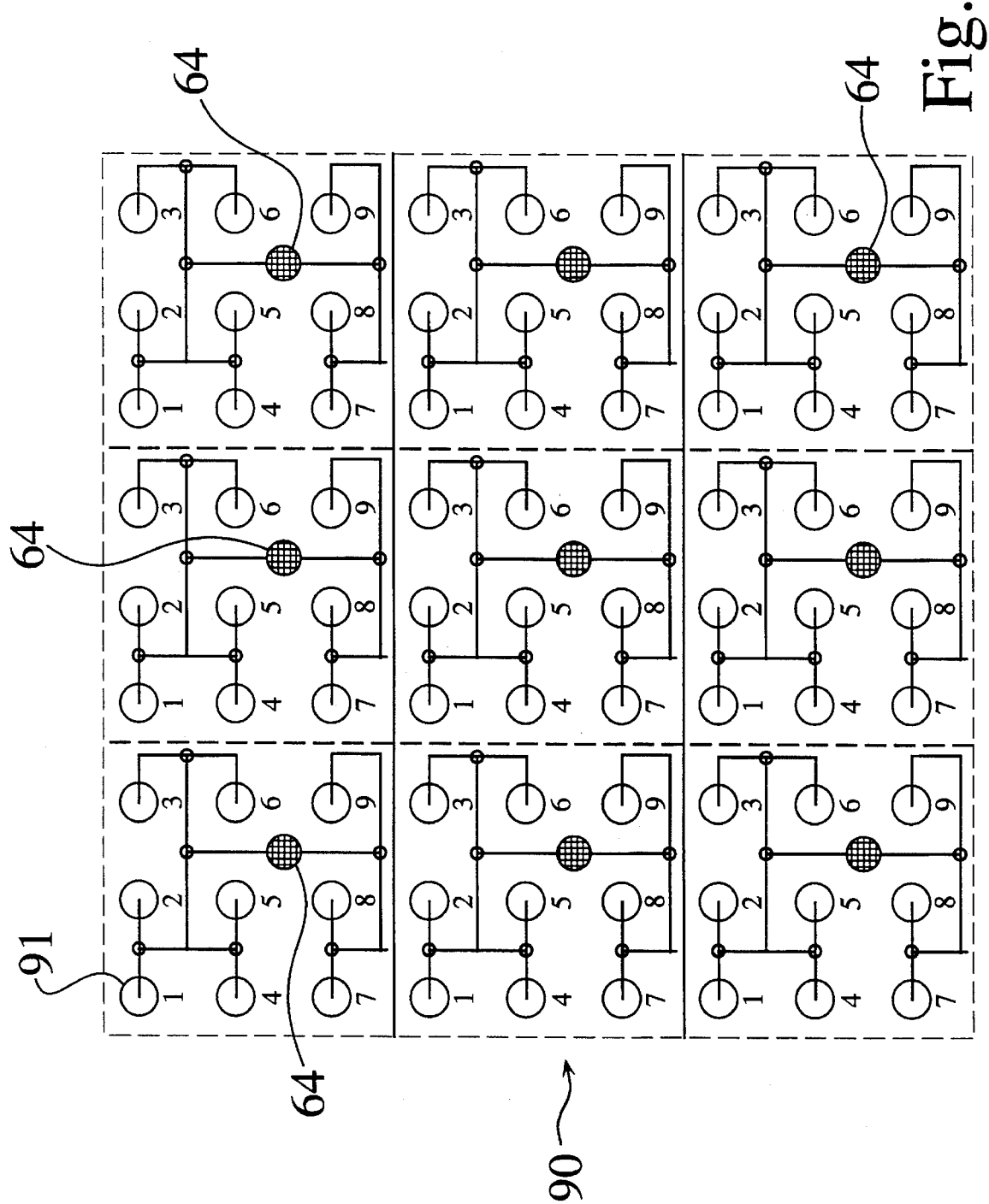
FIG. 12a is a diagram which shows schematically in plan view nine antenna feeds. Each feed is coupled to nine ports of a power dividing circuit. The signals from the nine ports may individually be attenuated by a digital attenuator such as that shown in FIGS. 9 and 10.
Figure 12B:
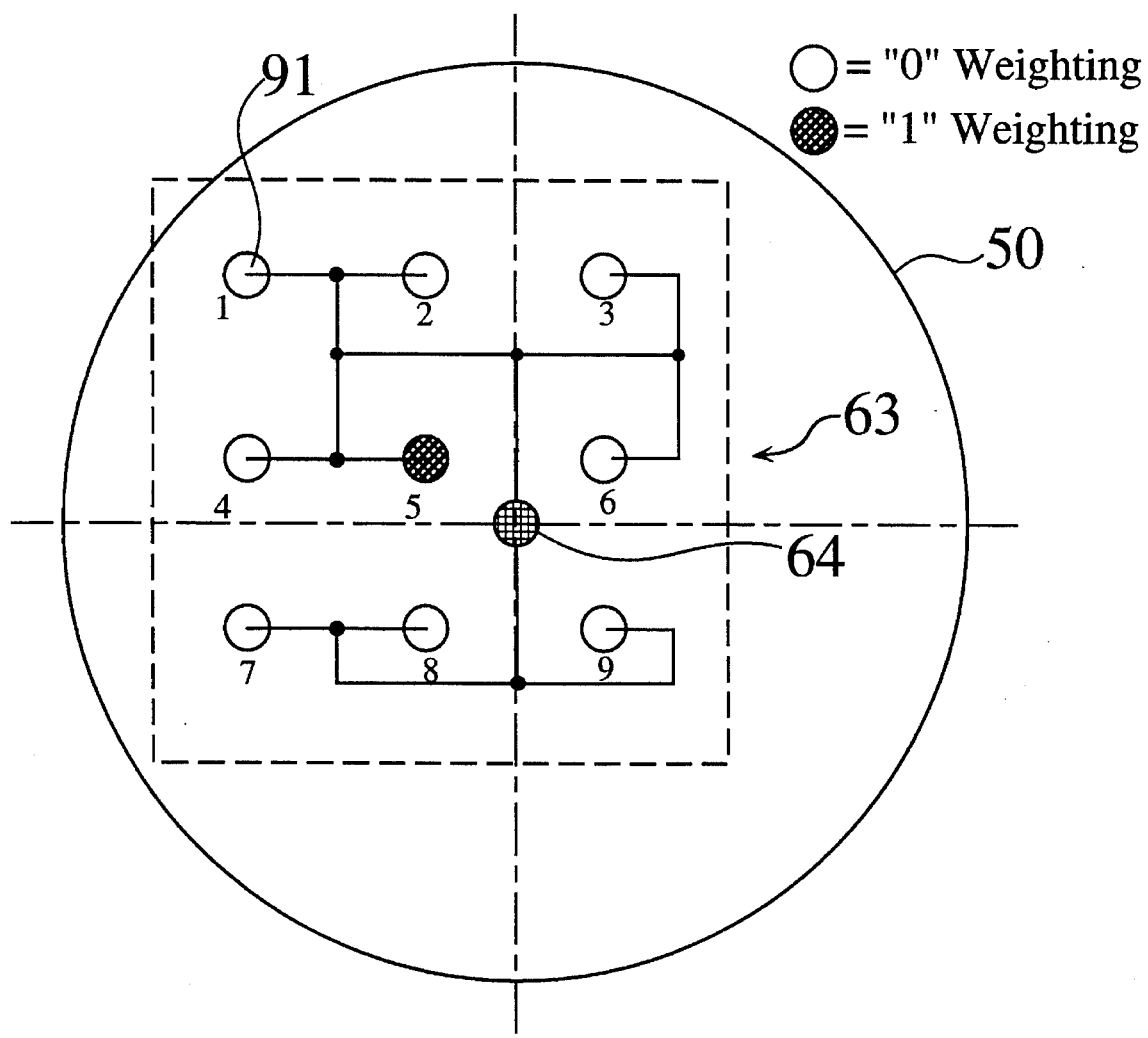
FIG. 12b is a plan view schematic diagram depicting the resultant beam from one feed element which is coupled to nine ports of a power dividing circuit in which the center port, which is associated with the nominal center of a beam, has an output weighted at a reference value of "one" and the eight other ports, associated with the eight neighboring beam components, are weighted with an output value of "zero", with respect the reference value. The direction to the Earth-fixed cell illuminated by the resultant beam is directly into the page.
Figure 12C:
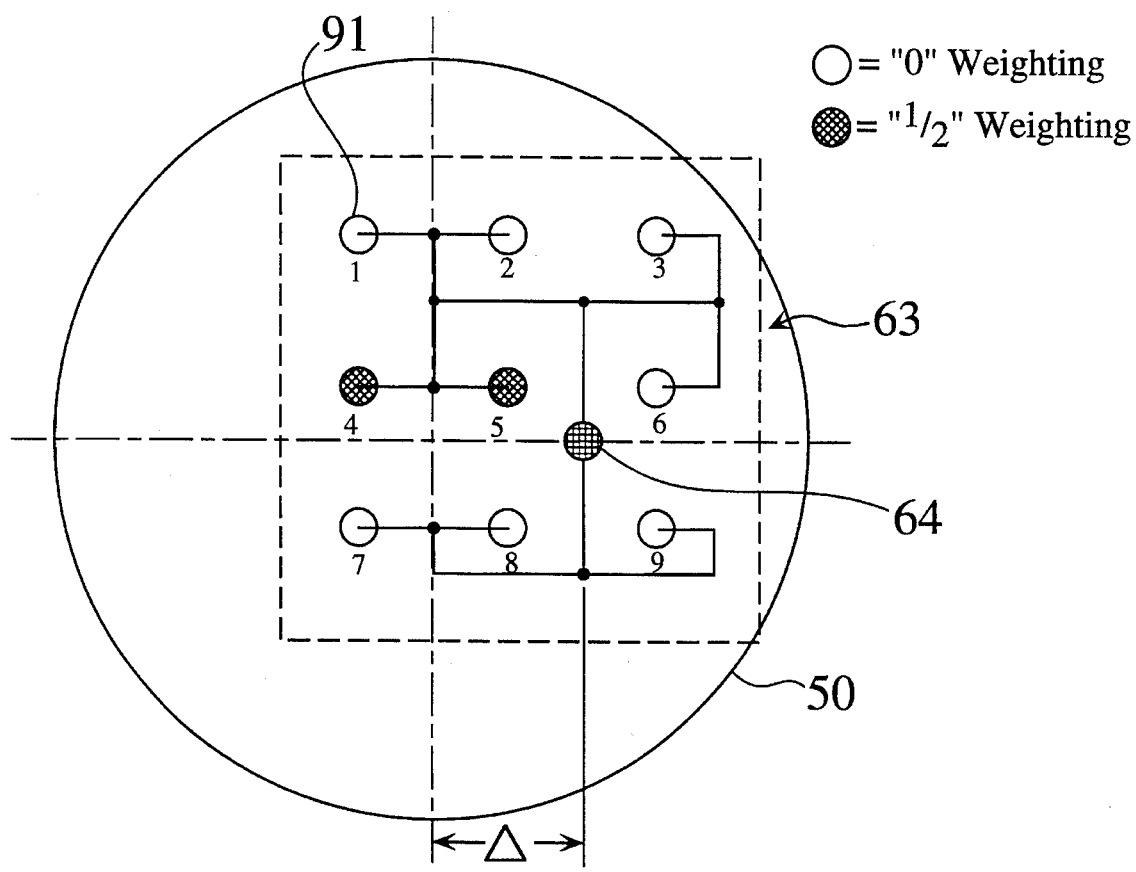
FIG. 12c is a plan view schematic diagram depicting the resultant beam of one feed element coupled to nine ports of a power dividing circuit in which the center port, associated with the center of a beam, has an output weighted at a reference value of "one-half", a neighboring port output is weighted at a value of "one-half", and the remaining neighboring ports are weighted with an output value of "zero", with respect the reference value. The direction to the Earth-fixed cell illuminated by the resultant beam is offset by an angle "Δ".

FIGS. 12a, 12b and 12c depict how the weighting of each beam component steers the beam. FIG. 12a is a diagram which shows schematically in plan view a feed pattern 90 for super cell 24 containing nine cells 26. Antenna feeds 63a–i are each connected by a wave guide 64 to ports 91 of a nine power dividers 70. The signals at each port 91 may individually be attenuated by a digital attenuator 78 such as shown in FIG. 9, which results in steering a received beam 30.

FIG. 12b is a plan view schematic diagram depicting the resultant beam footprint 50 of one feed element 63 which is connected by wave guide 64, to a first beam port 91 of nine power dividers 70. The center port 91(5) output, associated with the nominal beam center position, is weighted at a reference value of "one" and the eight neighboring ports 91(1–4, 6–9) are weighted with an output value of "zero", with respect the reference value. The direction to the Earth-fixed cell 26t illuminated by the resultant beam footprint 50 is directly into the page.

FIG. 12c is a plan view schematic diagram depicting the resultant beam footprint 50 of one feed element 63 coupled to ports 91 of nine power dividers 70. The center port 91(5) output, associated with the nominal beam center position, is weighted at a reference output value of "one-half", a neighboring port 91(4) output is weighted at a value of "one-half", and the remaining neighboring ports are weighted with an output value of "zero", with respect the reference value. The direction to the cell 26t illuminated by the resultant beam footprint 50 is offset by an angle "α". This represents a distance at the Earth's surface of about 0.6 cell width.

Transmit Scanning Beam Antenna

Figure 10:
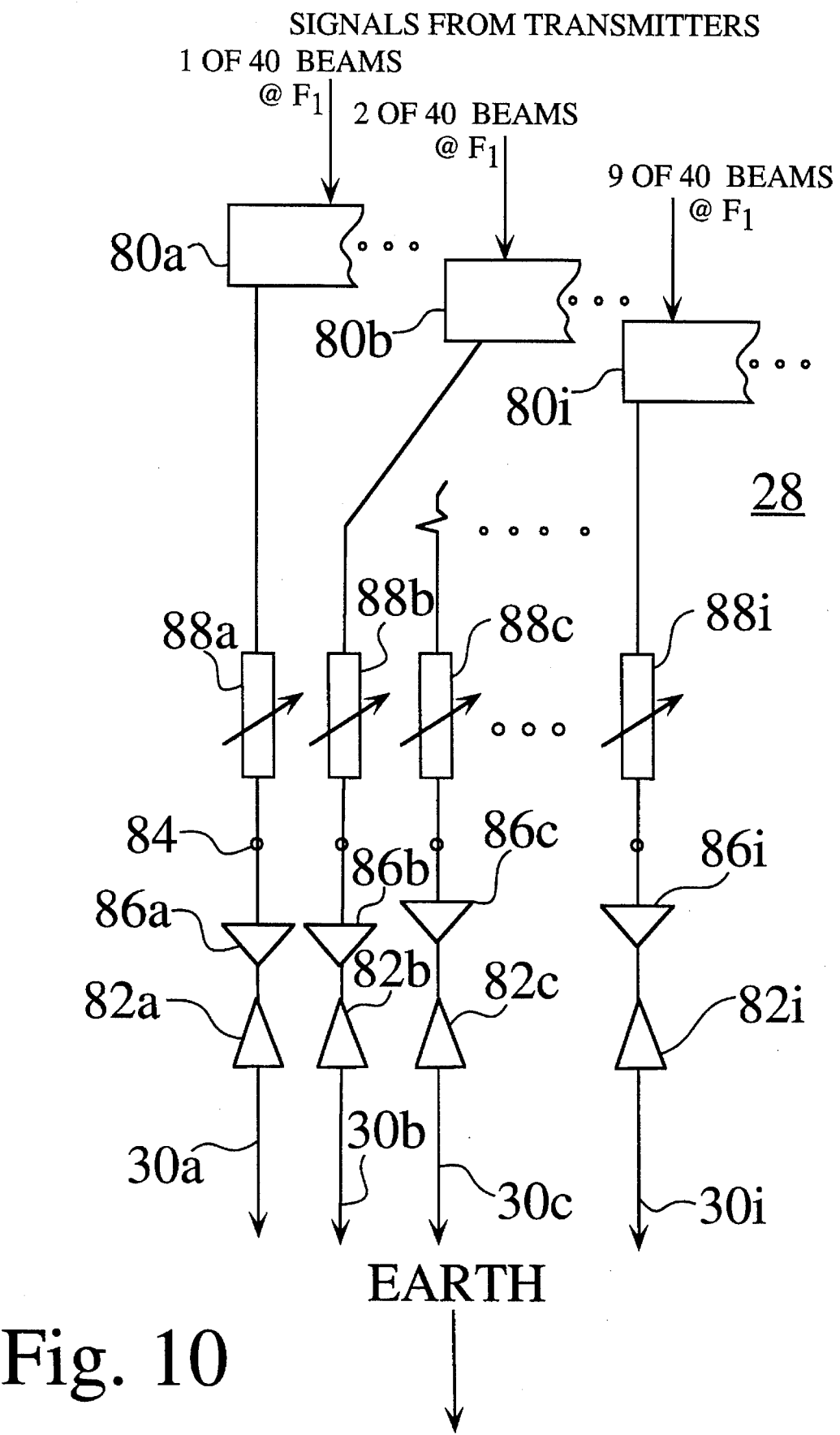
FIG. 10 is a block diagram of a scanning beam transmit antenna. This figure illustrates the variable power dividers, digital attenuators and variable power combiners which are employed to steer the transmitted beams in one preferred embodiment.

In one preferred embodiment, nine transmit scanning beam antennas 28 having nine lenses 60 are required to maintain reasonable power efficiency. FIG. 10 depicts one of these nine scanning beam antennas 28 in which the beam steering is accomplished at the transmitter final stage. Each of the transmit feeds 82 is driven by a variable saturation, high power amplifier (HPA) 86. The HPA's are partitioned into forty to forty-four groups of HPA'S. Nine amplifiers 86, correspond to feed elements 82, in a three by three grid on the lens 60 surface. Each of the nine HPA's 86 in a group is connected to one of the outputs of a nine-way power divider 80 driven by a transmit signal $F_1$. To steer one beam 30 involves eight adjacent beams 30. The adjacent beams 30 therefore could not be used for transmitting. A single transmit lens 60 would appear to result in almost 10 dB of loss due to the required use of either linear amplifiers or of post amplifier nine-way power combiners. Since the satellite 12 has limited power, this results in a reduction of communications capacity. To maintain a reasonable power efficiency, forty to forty-four feed elements 63 are mounted to one lens 60; therefore nine transmit lenses 60 are required to support 361 beams 30.

As in the case of the scanning beam antenna 28 used for receiving, adjustment of each of nine attenuators 88 associated with one of the 361 power combiners 8 shapes and steers the associated transmit beam 30. The digital attenuators 88 are adjusted to amplitude weight the transmit beam components which shape and steer the beam 30.

Figure 11:
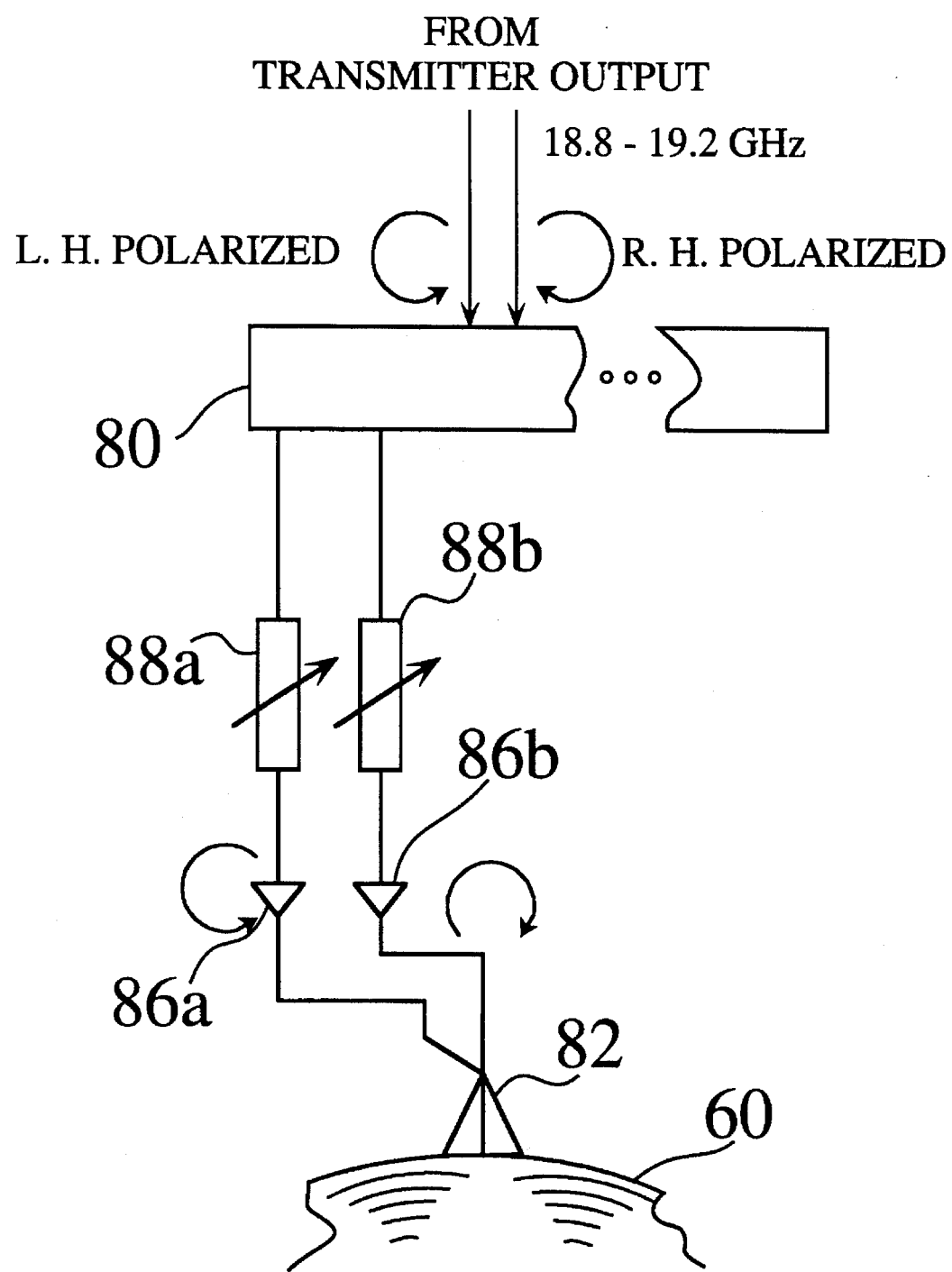
FIG. 11 is a schematic diagram that shows the combining of one transmit frequency into one feed element at two different polarizations.

If some loss can be accepted, fewer transmit lenses 60 can be used by implementing different methods which combine two or more transmitter signals at one feed element 82, for example, diplexers, polarization combining, or space combining. FIG. 11 shows combining two transmitters, at the same frequency but circularly polarized in opposite rotation, at one feed element 82. This would reduce the number of transmit antenna-lens combinations to five.

Figure 13:
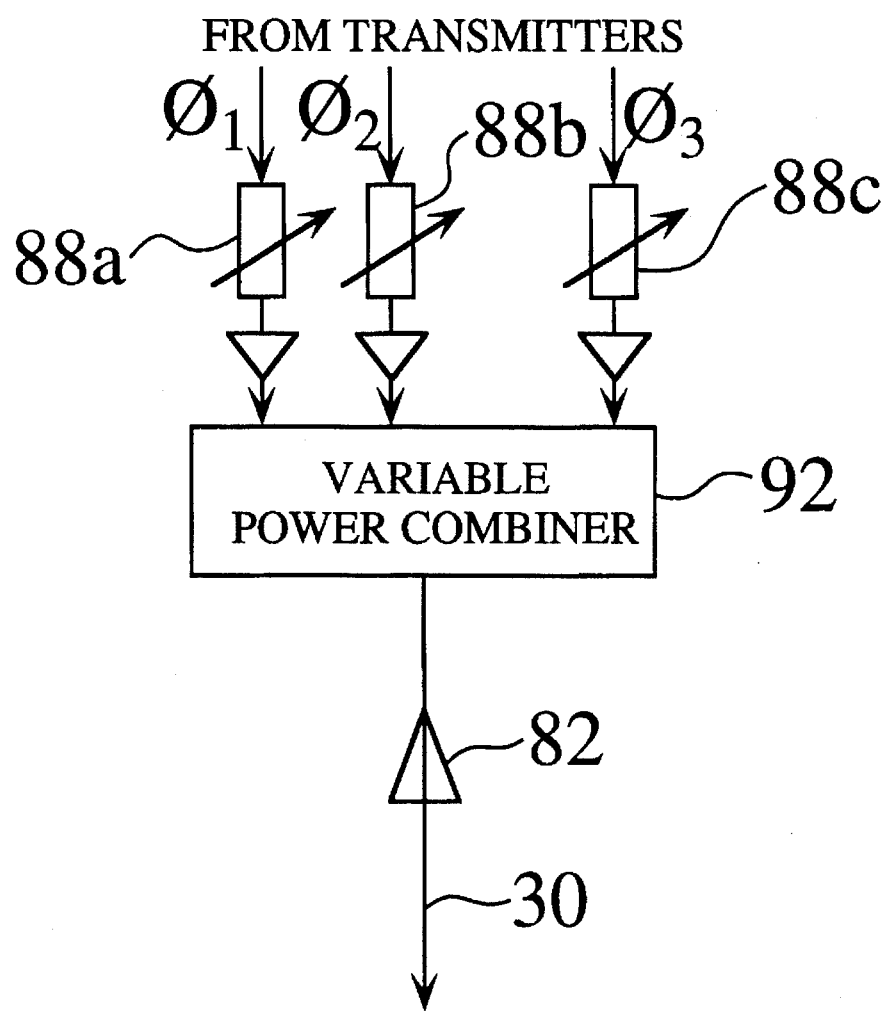
FIG. 13 is a schematic diagram of an alternative method of feeding one feed element with combined transmit signals at three different phase angles.

FIG. 13 depicts combining three transmitters at one feed element 82 by phasing the signals 120 degrees apart. This would reduce the number of transmit antenna-lens combinations to three. However, a power loss is suffered because the three-phased signals would have some isolation resulting in combining loss in the variable power combiner 92.

Figure 14:
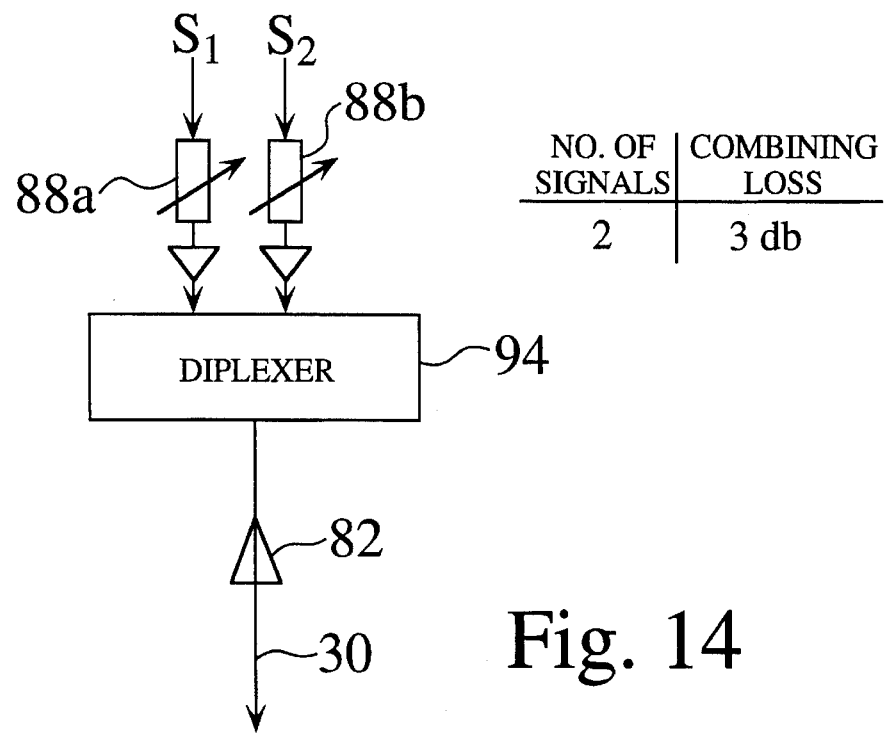
FIG. 14 is a schematic diagram of an alternative method of feeding one feed element with two transmit signals combined in a diplexer.

FIG. 14 indicates the combination of transmitter signals S1, S2 combined in the same feed 82 by means of a diplexer. Combining two signals in this way results in a 3 dB combining loss but reduces to five the number of scanning beam antennas 28 needed for transmitting.

Figure 15:
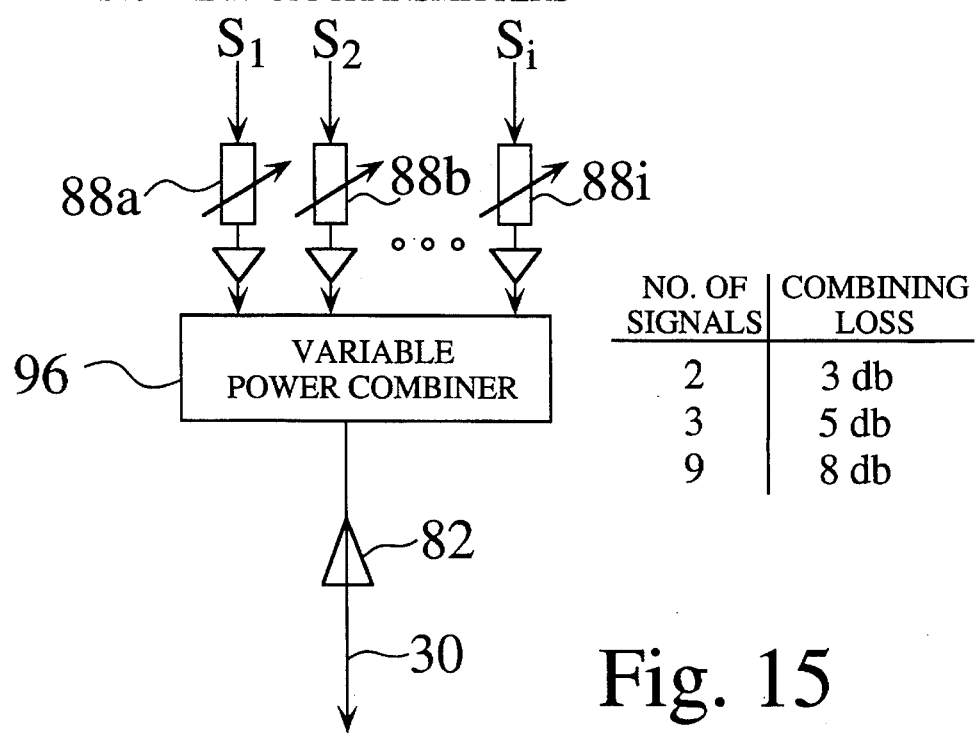
FIG. 15 is a schematic diagram of an alternative method of feeding one feed element with combined transmitted signals in a variable power combiner.

FIG. 15 depicts the combining of multiple transmitter signals $S_1\_S_i$ in a variable power combiner 96. The combining losses for the combination of two, three or nine signals $S_1\_S_i$ are 3 dB, 5 dB, and 8 dB respectively. Combining nine signals in this manner reduces the required number of transmit scanning beam antennas 28 to just one.

Persons ordinarily skilled in the art will recognize that, depending on the beam power requirements, heating of the lens material by the transmitted beam may require the employment of up to one lens per cell. Use of HTP materials can help mitigate this factor.

Gateway-Satellite Link (GSL) Antenna

Figure 16:
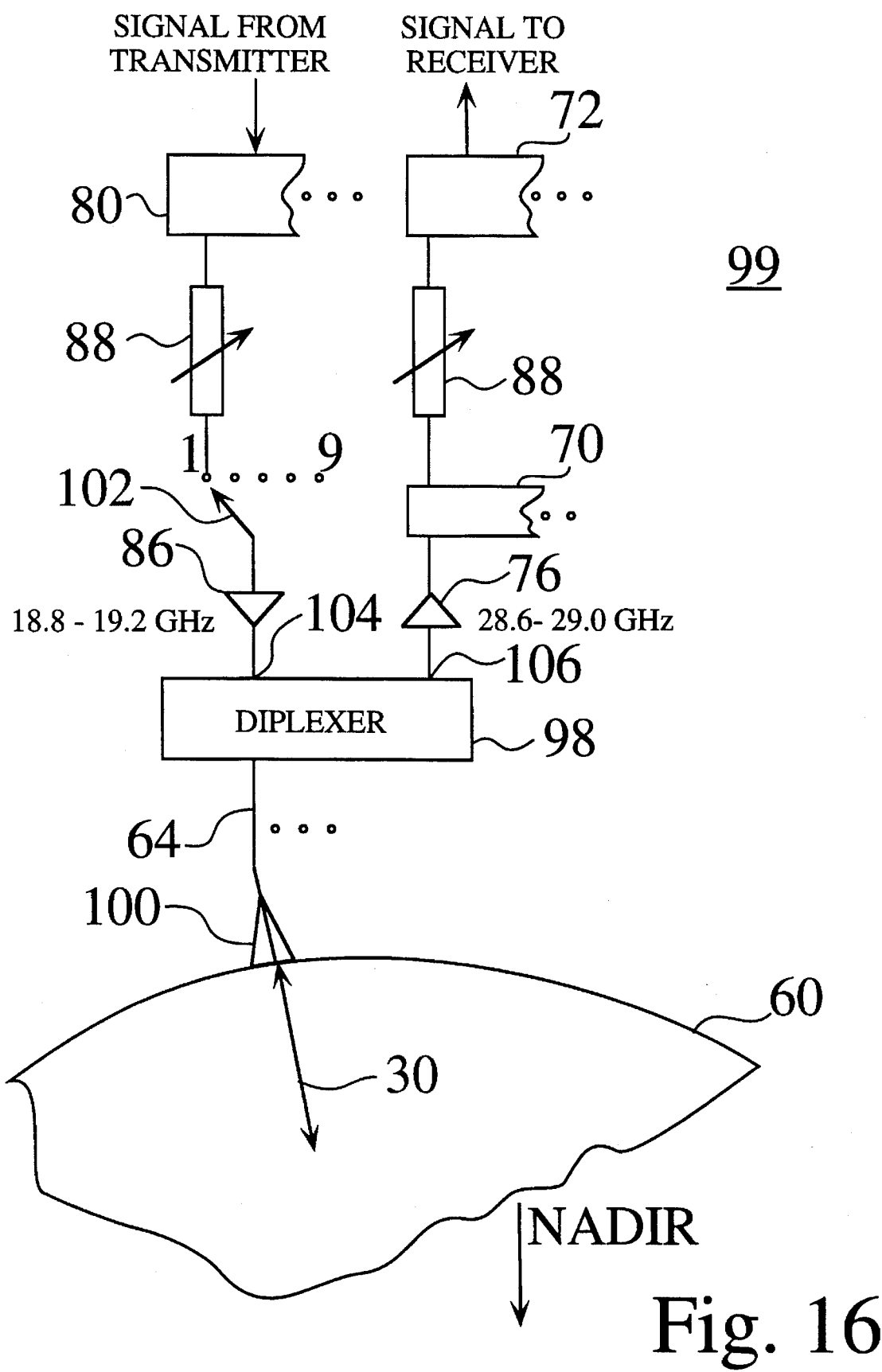
FIG. 16 depicts a method of transmitting and receiving signals through one feed element, used in a single scanning beam antenna having a spherical dielectric lens, for communication with a gateway terminal.

The satellite GSL antenna 99 is shown in FIG. 16. It includes one Luneberg lens 60, used for both transmit and receive. The lens provides 41 dB of gain at 20 GHz and 44 dB of gain at 30 GHz. It has a diameter of 30 inches. Mounted to the lens 60 are 3,249 feeds 100, spaced according to 3,025 "spots" in the satellite footprint 16 plus 224 pseudo spots. The pseudo spots are an extra row of spots around the satellite footprint 16 to facilitate shaping and steering of the spots at the edge of the footprint 16.

Each of the 3,249 feeds 100 is connected to a 30/20 GHz diplexer 98. The 30 GHz receive port 106 is connected to a 30 GHz LNA 76. The LNA output is connected to a nine-way power divider 70. Each of the power divider 70 outputs is input to a different nine-way power combiner 72 through a digital attenuator 88. One of the power combiners 72 corresponds to the nominal beam location associated with the feed 100. The other combiners 72 correspond to the nominal locations associated with eight adjacent feeds 100. Thus each of the power combiners 72 is connected to the nine feeds 100 that form a three by three grid on the lens surface. Adjusting the nine digital attenuators at the inputs of one of the 3,025 power combiners 72 shapes the associated one of the 3,025 receive beams 30 and steers it on the Earth's surface E.

The output of the (n,m) power combiner 72, $2 \leq n \leq 56$, $2 \leq m 56$, is the (n, m) receive beam. This output may be calculated using Equation 2 as shown above.

Each 20 GHz diplexer port 104 is driven by a variable saturation high power amplifier (HPA) 86. The HPA's 86 are driven by the output of a nine-to-one switch 102. Each of the nine switch inputs is connected to the output of a nine-way power divider driven by the transmit signal for one of the 3,025 beams 30.

Because formation of each transmit beam 30 involves nine feed elements 100 and only a single transmit signal can be applied at each feed element 100, the total number of simultaneous transmit beams 30 that can be generated is limited to 361, and there must be at least two inactive beams 30 between active ones to prevent interference. This separation is also required to support 100 percent frequency reuse between active beams 30.

Beam Steering at the Receiver Base Band Frequency

Figure 17:
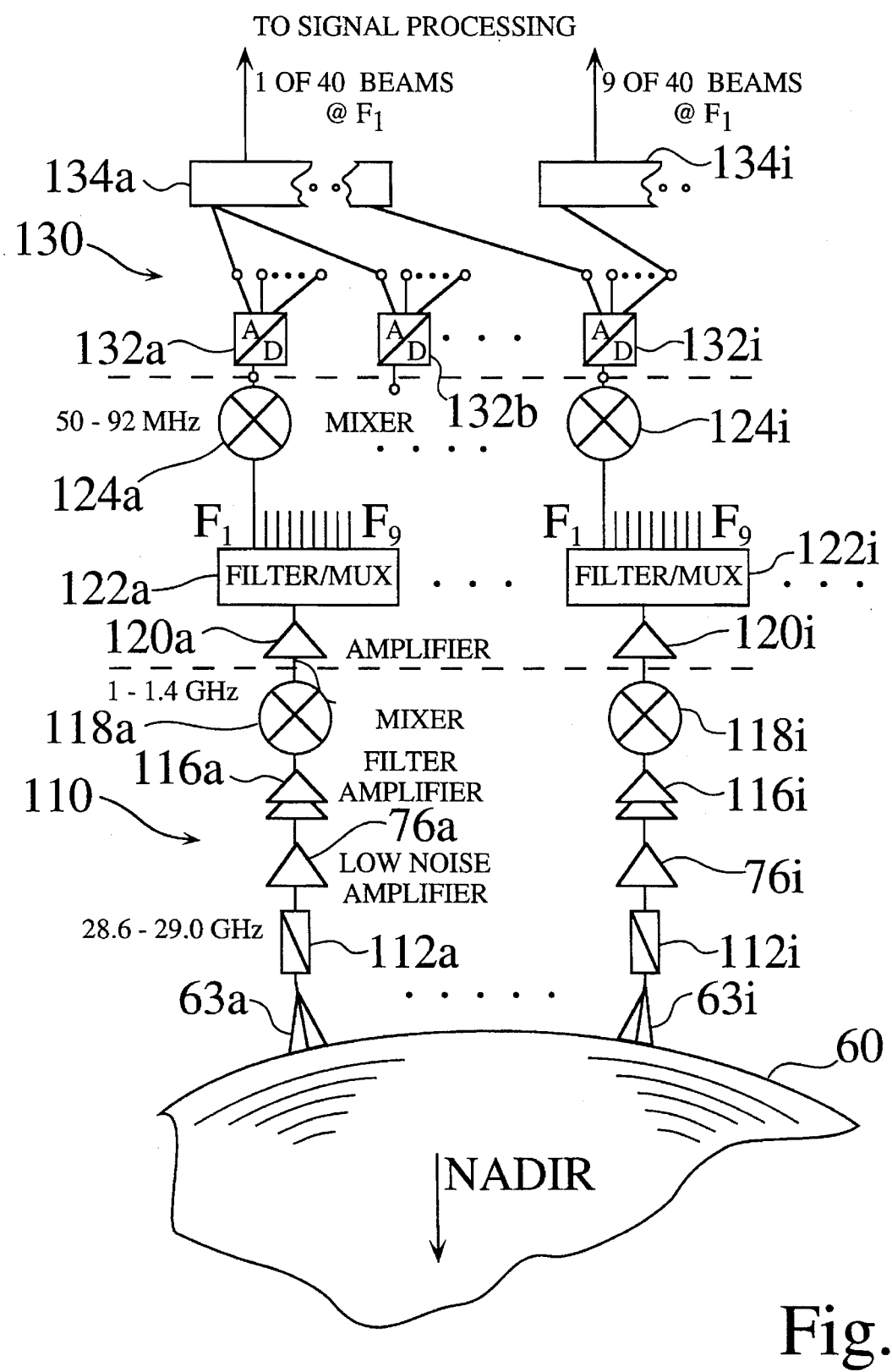
FIG. 17 is a block diagram of receiver signal dividing, weighting and recombining processing at base-band frequencies rather than at the receiver front end.

An alternate method of beam steering at the receiver base band frequency is shown in FIG. 17. Receiver "front-end" processing 110 for this alternative embodiment is conventional. For each one of a group of nine beams, the feed 63 is connected by a waveguide to the receiver first mixer 118 through a low noise amplifier 76 and a filter/amplifier 116. A test signal correction 112 may be inserted ahead of the LNA 76. The received frequency in the 28.6 to 29.0 GHz band is converted to an intermediate frequency (IF) of 1 to 1.4 GHz in the first mixer 118. The IF is amplified by an amplifier 120 and input by coaxial cable to a filter/multiplexer 122 which separates the output into the nine frequencies $F_1$–$F_9$ used for the terminal-satellite link communications. The outputs from the filter/multiplexer 122 are converted to the base band frequency of 50 to 92 MHz by nine second-mixer stages 124. Base band processing 130 is used to accomplish beam steering and shaping. The output of each second-mixer stage is fed to a different analog-to-digital (A/D) converter 132 which divides the signal into the nine components corresponding to the nine feed elements 63 which form one beam. For example, the digital outputs of a first A/D converter 132a are connected to a nine-to-one combiner 134a. Each of the other eight outputs of the A/D converter 132b–i are fed to a different combiner 134b–i. One of the combiners 134a corresponds to the nominal beam location associated with the feed 63a at a first frequency $F_1$. The other combiners 134b–i correspond to the nominal locations associated with eight adjacent feeds 63b–i at a first frequency $F_2$. Thus each of the power combiners 134a–i is connected to the nine feeds 63a–i that form a three by three grid on the lens surface. The output of each combiner 134 is the receive beam. Adjusting the amplitude of the signals at each A/D converter 132 shapes and steers the beam 30 on the Earth's surface E.

Beam Steering at the Transmitter Base Band Frequency

Figure 18:
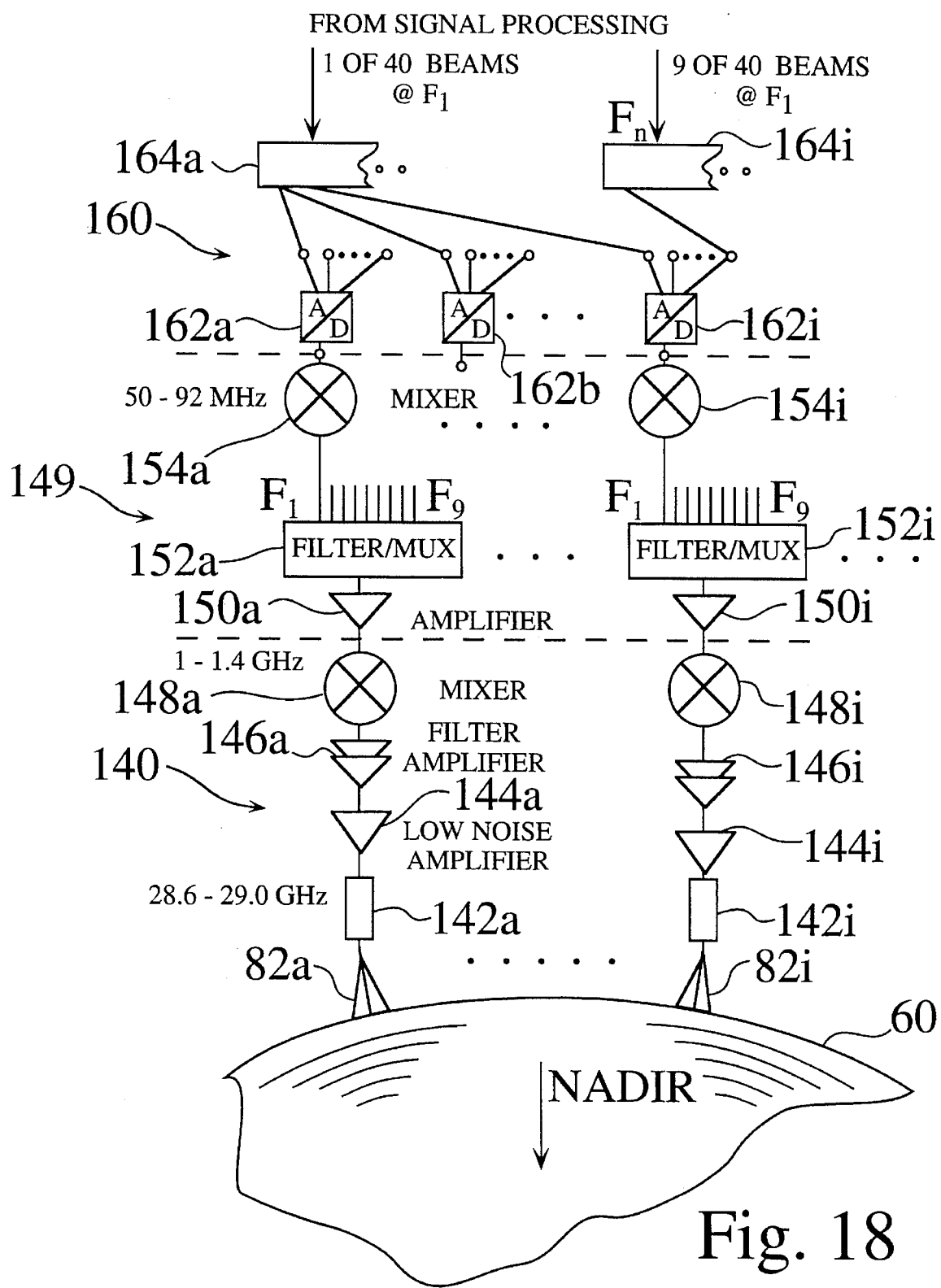
FIG. 18 is a block diagram of transmitter signal dividing, weighting and recombining processing at base-band frequencies rather than at the transmitter "final stage".

As shown in FIG. 18, the alternate method of beam steering at the transmitter base band frequency is essentially the same as for the receiver except the flow of signals is reversed. In the base band processing, signals at 50–92 MHz, for each beam of the 40 to 44 groups of beams at a first frequency $F_1$ are fed from the satellite's communications system to 361 nine-way power dividers 164. Each of the outputs of the nine-way dividers 164 are connected to different A/D converters 162. The 50–92 MHz output from a first A/D converter 162a at a first frequency $F_1$ associated with a first beam 30a, is converted to the IF band of 1 to 1.4 GHz in a first mixer stage 154 and fed by coaxial cable to a first filter/multiplexer 152a. The outputs of eight mixers 154 at the eight other communications frequencies $F_2$–$F_9$, and which are associated with the first beam 30a are combined with the first frequency $F_1$ in the first filter/multiplexer 152a. The combined signal output from the first filter/multiplexer 152a is amplified by amplifier 150a and converted up to the final frequency band of 28.6 to 29.0 GHz in a second mixer 148a. This signal is amplified and filtered in an AGC controlled filter/amplifier 146a and carried by wave guide to the feed 82a through a bandpass filter 142a. The beam 30a emerging from the feed 82a is shaped and steered by adjusting the amplitude of the signals output from each of the A/D converters 162a–i.

FIG. 19 is a three dimensional plot of one quadrant of the surface of a spherical lens of 9.9 inches diameter used for receiving at 30 GHz. It depicts the projection of Earth-fixed cells on the lens surface, showing the transition from inscribed squares of circular beams to inscribed rectangles of elliptical beams necessary to illuminate cells from Nadir to the extreme mask angle. FIG. 20 depicts a three dimensional plot of one quadrant of the surface of a spherical lens of 15 inches diameter used for transmitting at 19 GHz. It depicts the projection of Earth-fixed cells on the surface, and also shows the transition from inscribed squares of circular beams to inscribed rectangles of elliptical beams necessary to illuminate cells from Nadir to the extreme mask angle. These figures were referred to above in the discussion of FIG. 4.

Figure 21:
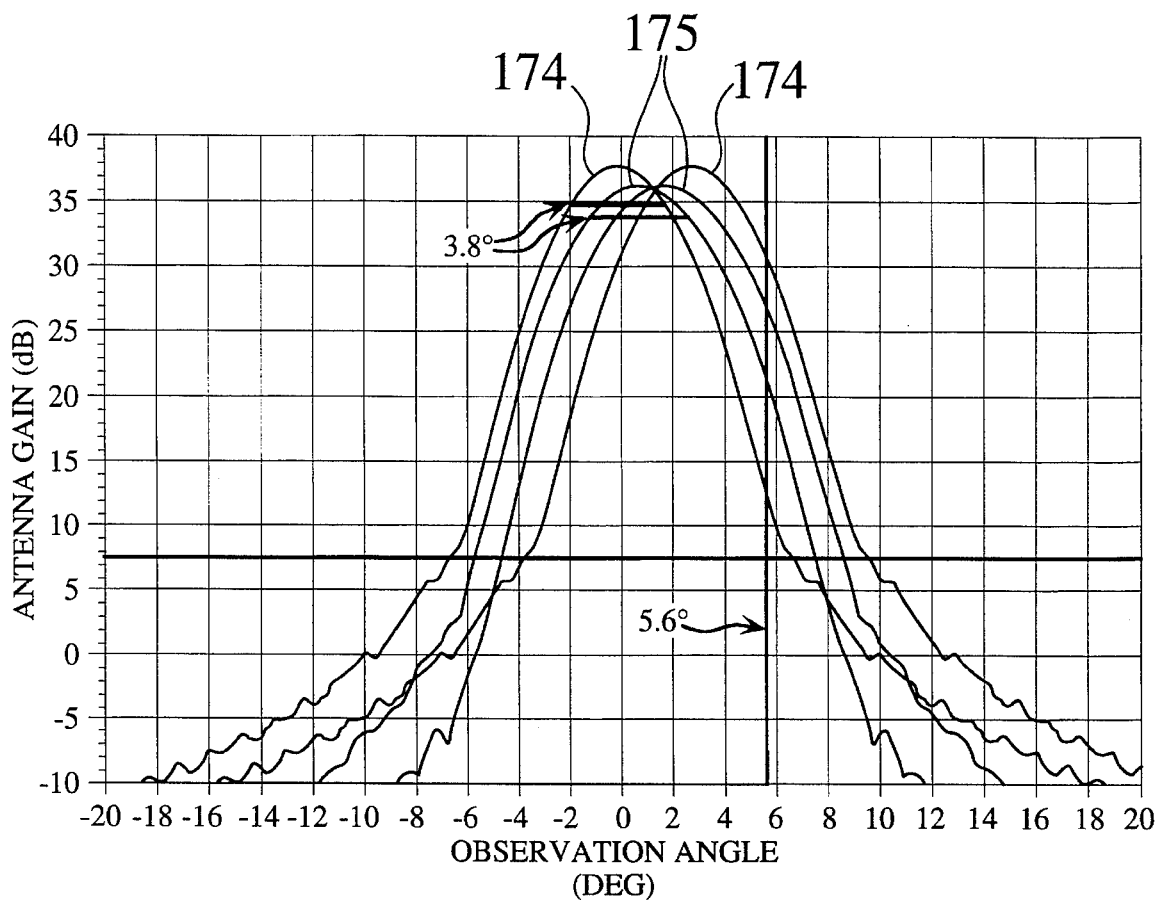
FIG. 21 is a rectangular plot of antenna gain v. observation angle of a beam for two different feeds at a frequency of 19 GHz and the combined pattern for both feeds for a typical Luneberg lens-feed combination which can be used with the present invention.

FIG. 21 is a rectangular plot of antenna gain versus observation angle of a beam at a frequency of 19 GHz, for a typical Luneberg lens-feed element combination which can be used with the present invention. The plots show 3 dB beam widths and off-axis requirements for 30 dB sidelobes. The plot depicts individual patterns for two different feeds 174 and the combination pattern for both feeds 175 simultaneously active.

Figure 22:
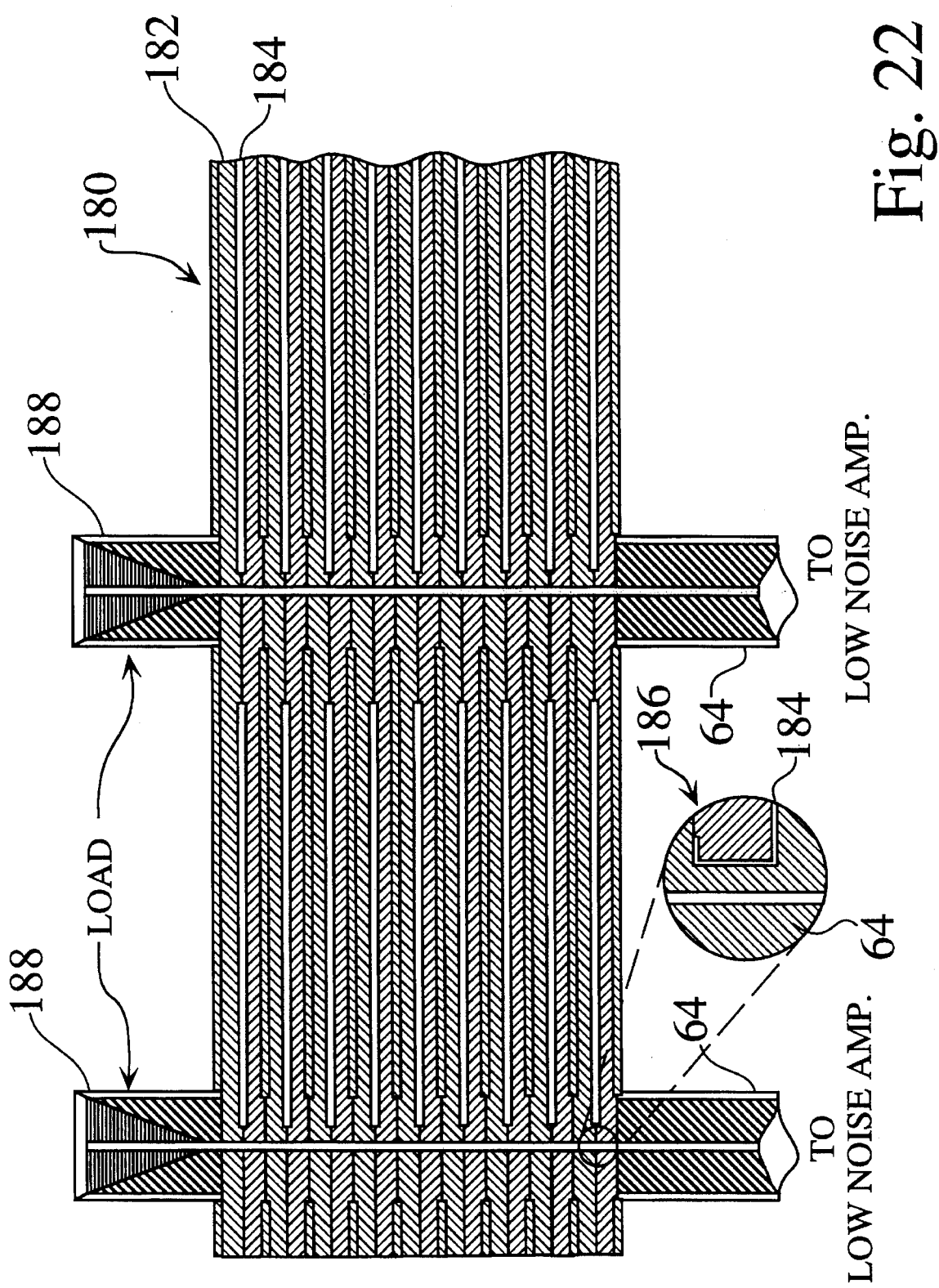
FIG. 22 is a cross-sectional view of a beam coupler circuit using a "sandwich" construction for circuit boards on which power divider and power combiner circuit elements are mounted, showing how the antenna feed element waveguides are coupled to the circuit boards.

FIG. 22 is a cross-sectional view of a beam coupler circuit 180 using a sandwich construction of dielectric material 182 and circuit boards 184 on which power divider/power combiner, and attenuator circuit elements are mounted. In inset 186, FIG. 22 reveals how the antenna feed element waveguides 64 are coupled to the circuit boards 184. Each feed 63 is followed by a LNA. The LNA output is connected via nine 20 dB couplers 186 to nine different layers of the sandwich 180. The LNA outputs are terminated after the couplers 186 in a 50 ohm load 188. The sandwich is approximately seven inches square and one inch thick.

Figure 23:
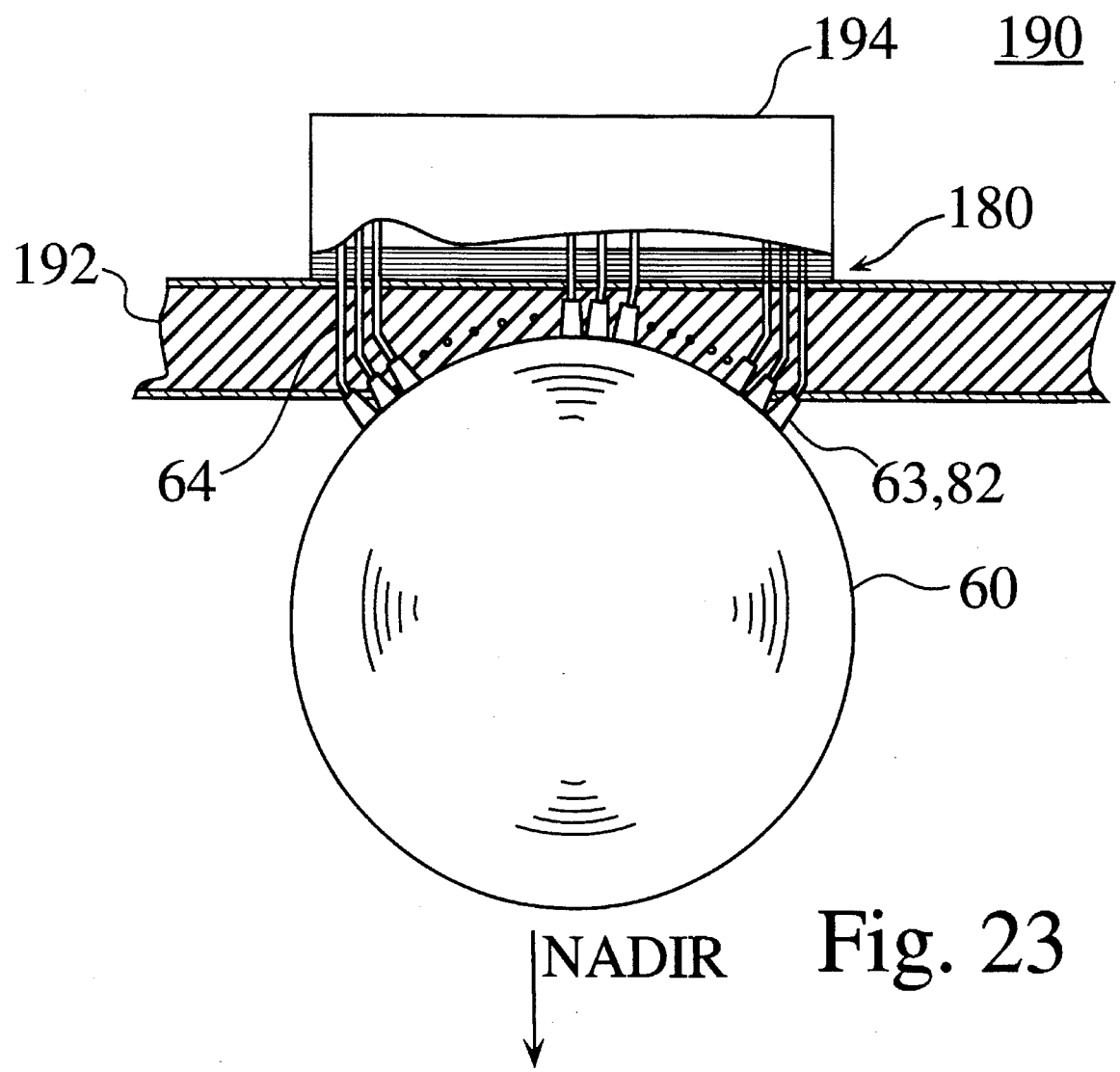
FIG. 23 is partially-sectioned schematic view of a scanning beam antenna, according to the present invention, and the electronics module assembled to a satellite platform.

FIG. 23 is partially sectioned schematic view 190 of a scanning beam antenna 28. This figure depicts a configuration in which the spherical lenses 60 and an electronics module 194, are assembled to a satellite platform 192. The feeds 63, 82 are mounted to the spherical lens 60. Waveguides 64 from each feed are passed through the platform 192 to terminate in the beam coupler circuit 180 sandwich. Other electronic components of the system are housed in the module 194. The electronics module 194 which is part of the total on-board electronics for the satellite 12, is mounted on the "space" side of the satellite platform 192 for thermal control.

CONCLUSION

Although the present invention has been described in detail with reference to a particular preferred embodiment and particular alternate embodiments, persons possessing ordinary skill in the art to which this invention pertains will appreciate that various modifications and enhancements can be made without departing from the spirit and scope of the claims which follow. The various orbital parameters, satellite population and configuration statistics that have been disclosed above are intended to educate the reader about one preferred embodiment, and are not intended to constrain the limits of the invention or the scope of the claims. For example, the number of Earth-fixed supercells and cells within the Earth-fixed grid may be varied to suit particular disparate applications without departing substantially from the gist of the invention. Although the specification refers to several particular embodiments of dielectric lenses, namely the Luneberg lens and the constant-k lens, different dielectric lens designs may be suitable for implementing the present invention. In the following claims, the recitation of a "satellite 12" pertains to a satellite in the generic sense, and is not intended to be restricted to any particular design or configuration so long as the satellite can reasonably implement the Earth-fixed cells method and the method of electronically steering beams from a scanning beam antenna array. The List of Reference Characters which follows is intended to provide the reader with a convenient means of identifying elements of the invention in the specification and drawings. This list is not intended to delimit or narrow the scope of the claims.

LIST OF REFERENCE NUMERALS

FIGS. 1 through 16
10 Constellation of satellites
11 Orbit
12 Satellite
15 Mask angle at edge of footprint
16 Beam footprint at 40 degrees mask angle
18 View of one footprint illuminating Earth-fixed grid
20 Earth-fixed grid
22 Enlarged view of Earth-fixed grid, supercell and cell
24 Supercell
26 Cell
26t Target cell
28 Scanning beam antenna
30 Earth-fixed beam
32 Beams with no beam steering
34 Satellite-fixed cell
35 Satellite-fixed cell footprint
36 Low mask angle
38 Beam width in degrees
40 Coverage circle at 32 degrees mask angle
42 Great circle boundary between adjacent satellites
44 Inscribed square of 6×6 supercells in satellite footprint
50 Earth-fixed cell beam footprint
52 Pseudo-cell beam footprint
60 Spherical dielectric lens
61 Plane wave front
62 Included angle between extreme beams
63 Terminal-satellite link (TSL) receive antenna feed element
64 Wave guide
65 Lens and feed portion of a scanning beam antenna
70 TSL receive variable power divider (VPD)
72 TSL receive variable power combiner (VPC)
74 Power divider input port
76 Low noise amplifier (LNA)
78 Digital attenuator-receive antenna
80 Terminal-satellite link (TSL) transmit, variable power divider
82 TSL transmit antenna feed element
84 TSL transmit power divider exit port
86 TSL high power amplifier (HPA)
88 Digital attenuator-transmit antenna
90 Supercell, cell feed pattern-scanning beam antenna-to-power divider port
91 Power divider ports, 3 by 3 grid
92 Variable power combiner-3-phase feed
94 Diplexer, multiple-frequency signal feed
96 Variable power combiner-combined signal feed
98 Low noise diplexer-transmit/receive
99 Gateway-satellite link antenna
100 Transmit/receive feed element
102 Nine-to-one switch
104 20 GHz transmit port
106 30 GHz receive port
D Lens diameter
d Distance from lens centerline to extreme feed element
E Earth
$e_{1-3}$ Rays paths through a Luneberg lens from a point source
$F_1$–$F_n$ Frequencies of transmitted or received signals
$P_1$ Point source of radiation
$S_1$–$S_n$ Transmitter signals
$T_1$–$T_3$ Incremental time periods
$W_a$ Width of inscribed square of supercells in satellite footprint at 40 degrees mask angle
$W_b$ Width of inscribed square of all cells within great circle boundary between satellites
Δ Beam deflection (degrees) during steering
FIGS. 17 through 23
60 Spherical dielectric lens
63 TSL receive antenna element
76 Low noise amplifier
110 Receiver front end
112 Test signal correction
116 Bandpass filter/amplifier
118 First mixer
120 Amplifier
122 Filter/multiplexer
124 Second mixer
120 Receiver baseband processing
132 Analog-to-digital converter
134 Variable power combiner
140 Transmitter final stage
142 Waveguide
144 Final amplifier
146 Filter/amplifier
148 Second mixer
150 Amplifier
152 Filter/multiplexer
154 First mixer
160 Transmitter front end
162 Analog-to-digital converter
164 Variable power divider
170 Cell projection on spherical dielectric lens at 30 GHz
172 Cell projection on spherical dielectric lens at 20 GHz
FIGS. 21 through 23
64 Waveguide
174 Individual antenna gain patterns for two different feeds
175 Combination antennas pattern for two feeds simultaneously active
180 Beam coupler circuit board sandwich
182 Insulator
184 Circuit conductor
188 50 ohm load
186 Enlarged view of waveguide-to-strip line circuit coupling
190 Partially sectioned view of scanning beam antenna and electronics module on satellite platform
192 Satellite platform
194 Electronics module

What is claimed is:

1. A method for providing a plurality of beams transmitted and received from positions in Earth orbit, for communicating directly with a plurality of portable, mobile and fixed terminals and gateways comprising the steps of:

orbiting a constellation of satellites (10) in low Earth orbit (11);

creating an Earth-fixed grid (20) defining a plurality of Earth-fixed supercells (22); said plurality of Earth-fixed supercells (22) including a plurality of Earth-fixed cells (26);

deploying a plurality of scanning beam antennas (28) on each satellite (12) within said constellation (10) of satellites;

simultaneously receiving a plurality of beams (30) with one of said plurality of scanning beam antennas (28) and simultaneously transmitting a plurality of beams (30) with another of said plurality of said scanning beam antennas (28) and simultaneously receiving and transmitting a plurality of beams (30) with another one of said plurality of scanning beam antennas (28); said beams (30) having a footprint (50) on the surface of the Earth (E);

forming said plurality of beams (30) with each of said plurality of scanning beam antennas (28) and continuously illuminating said plurality of Earth-fixed cells (26) by focusing said plurality of beams (30) on each said cell (26) with a spherically-shaped dielectric lens (60);

electronically shaping and steering each one of said plurality of beams (30) by amplitude weighting an antenna feed element (63, 82) at a nominal beam center position and a plurality of said antenna feed elements (63,82) at adjacent positions to keep each of said plurality of Earth-fixed cells (26) of said Earth-fixed grid (20) within said footprint (50) of each of a corresponding one of said plurality of beams (30) as said satellite (12) progresses along its said low Earth orbit (11); and communicating with said terminals and gateways in each of said plurality of Earth-fixed cells (26) with signals carried on said plurality of beams (30), each of said plurality of beams (30) operating at one of nine frequencies ($F_1$–$F_9$), said nine frequencies ($F_1$–$F_9$) being reused one-hundred percent for communications in each one of said plurality of supercells (22).

* * * * *